United States Patent
Wang et al.

(10) Patent No.: US 12,455,642 B2
(45) Date of Patent: Oct. 28, 2025

(54) CONTROL METHOD, ELECTRONIC DEVICE AND STYLUS

(71) Applicant: Beijing Xiaomi Mobile Software Co., Ltd., Beijing (CN)

(72) Inventors: Yue Wang, Beijing (CN); Shihhuang Pan, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 18/602,599

(22) Filed: Mar. 12, 2024

(65) Prior Publication Data

US 2025/0053253 A1   Feb. 13, 2025

(30) Foreign Application Priority Data

Aug. 11, 2023  (CN) .................. 202311016444.X

(51) Int. Cl.
  *G06F 3/038* (2013.01)
  *G06F 3/0354* (2013.01)
  (Continued)

(52) U.S. Cl.
  CPC .......... *G06F 3/038* (2013.01); *G06F 3/03545* (2013.01); *G06F 3/0383* (2013.01);
  (Continued)

(58) Field of Classification Search
  CPC .... G06F 3/038; G06F 3/0383; G06F 3/03545; G06F 3/041; G06F 3/0416; G06F 3/04162; G06F 3/0418; G06F 3/04182; G06F 3/0442; G06F 3/046; G06F 2203/0382; G06F 2203/0384; H04W 4/80
  See application file for complete search history.

(56) References Cited

U.S. PATENT DOCUMENTS

| 9,632,598 | B1 * | 4/2017 | Sundara-Rajan | ..... G06F 3/0383 |
| 2018/0095587 | A1 * | 4/2018 | Kurasawa | ............. G06F 3/0445 |

(Continued)

FOREIGN PATENT DOCUMENTS

| CN | 111868669 A | 10/2020 |
| WO | WO 2022111414 A1 | 6/2022 |

OTHER PUBLICATIONS

Extended European Search Report issued in Application No. 24166757.5 dated Sep. 30, 2024, 74 pages.

*Primary Examiner* — Cory A Almeida
(74) *Attorney, Agent, or Firm* — Finnegan, Henderson, Farabow, Garrett & Dunner, L.L.P.

(57) ABSTRACT

A control method includes: detecting first noise and determining at least one control parameter, in which the first noise is noise affecting wireless communication between a stylus and an electronic device, and the at least one control parameter includes a parameter controlling the wireless communication between the stylus and the electronic device; sending first indication information to the stylus, in which the first indication information includes at least one parameter value, each parameter value corresponds to one of the at least one control parameter, and the first indication information is configured to adjust the at least one control parameter to the corresponding parameter value; and controlling the wireless communication between the stylus and the electronic device in response to the adjusted control parameter.

9 Claims, 10 Drawing Sheets

(51) Int. Cl.
*G06F 3/041* (2006.01)
*G06F 3/044* (2006.01)
*G06F 3/046* (2006.01)
*H04W 4/80* (2018.01)

(52) U.S. Cl.
CPC ........ *G06F 3/0416* (2013.01); *G06F 3/04162* (2019.05); *G06F 3/0418* (2013.01); *G06F 3/0442* (2019.05); *G06F 3/046* (2013.01); *H04W 4/80* (2018.02); *G06F 3/04182* (2019.05); *G06F 2203/0382* (2013.01); *G06F 2203/0384* (2013.01)

(56) References Cited

U.S. PATENT DOCUMENTS

2018/0292920 A1\* 10/2018 Li .................. G06F 3/0383
2019/0056803 A1   2/2019 Nussbaum et al.

\* cited by examiner

CONTROL METHOD, ELECTRONIC DEVICE AND STYLUS

CROSS-REFERENCE TO RELATED APPLICATION

This application is based on and claims priority to Chinese Patent Application No. 202311016444.X filed on Aug. 11, 2023, the entire content of which is incorporated herein by reference.

FIELD

The present disclosure relates to the field of styluses, and more particularly to a control method, an electronic device, and a stylus.

BACKGROUND

With the development of computer technology, styluses are more and more widely used, such as in tablet computers, foldable mobile phones, notebook computers or other electronic devices, and interaction between screens and styluses is also increasing. However, during the use of styluses, they are susceptible to noise interference, resulting in abnormal functions of the styluses.

SUMMARY

According to a first aspect of embodiments of the present disclosure, there is provided a control method, including: detecting first noise and determining at least one control parameter, in which the first noise is noise affecting wireless communication between a stylus and an electronic device, and the at least one control parameter includes a parameter controlling the wireless communication between the stylus and the electronic device; sending first indication information to the stylus, in which the first indication information includes at least one parameter value, each parameter value corresponds to one of the at least one control parameter, and the first indication information is configured to adjust the at least one control parameter to the corresponding parameter value; and controlling the wireless communication between the stylus and the electronic device in response to the adjusted control parameter.

According to a second aspect of embodiments of the present disclosure, there is provided a control method, including: receiving first indication information sent by an electronic device, in which the first indication information includes a parameter value corresponding to at least one control parameter, each parameter value corresponds to one of the at least one control parameter, the at least one control parameter is determined in case that first noise is detected by the electronic device, the first noise is noise affecting wireless communication between a stylus and the electronic device, and the at least one control parameter includes a parameter controlling the wireless communication between the stylus and the electronic device; adjusting the at least one control parameter to the corresponding parameter value; and controlling the wireless communication between the stylus and the electronic device in response to the adjusted control parameter.

According to a third aspect of embodiments of the present disclosure, there is provided an electronic device, including a processor; and a memory for storing an instruction executable by the processor. The processor is configured to detect first noise and determine at least one control parameter, in which the first noise is noise affecting wireless communication between a stylus and an electronic device, and the at least one control parameter includes a parameter controlling the wireless communication between the stylus and the electronic device; send first indication information to the stylus, in which the first indication information includes at least one parameter value, each parameter value corresponds to one of the at least one control parameter, and the first indication information is configured to adjust the at least one control parameter to the corresponding parameter value; and control the wireless communication between the stylus and the electronic device in response to the adjusted control parameter.

BRIEF DESCRIPTION OF DRAWINGS

The accompanying drawings, which are incorporated in and constitute a part of this specification, illustrate embodiments consistent with the present disclosure, and serve to explain the principles of the present disclosure together with the description.

DETAILED DESCRIPTION

Figure 1:
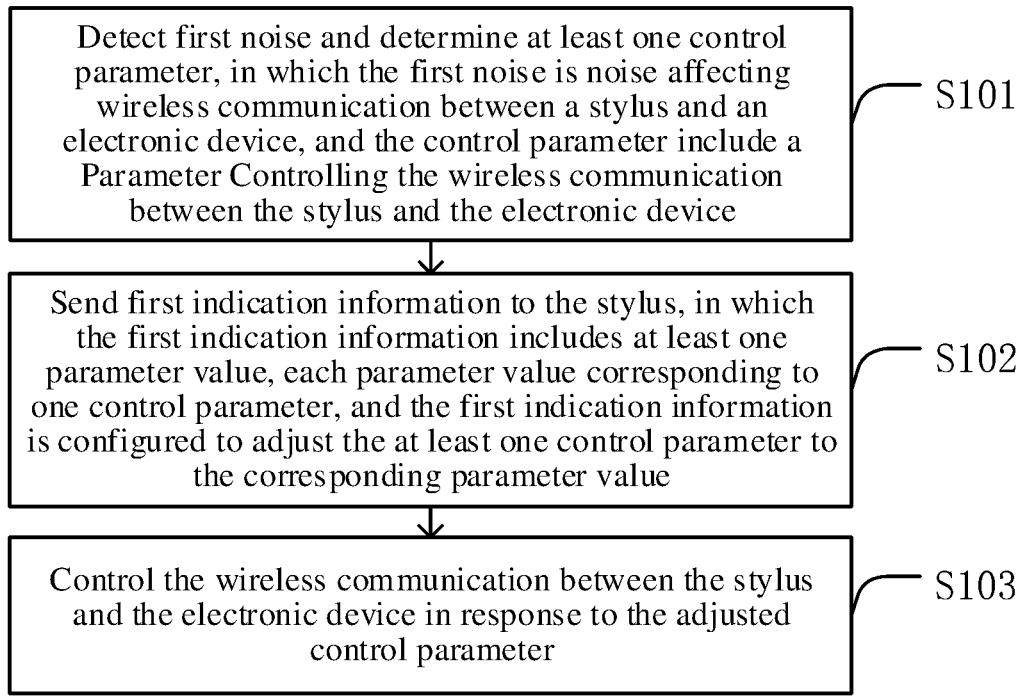
FIG. 1 is a flowchart of a control method according to an embodiment of the present disclosure.

Embodiments of the present disclosure are described in detail below, and examples of the embodiments are shown in accompanying drawings. Same or similar reference numerals from beginning to end indicate same or similar elements or elements having same or similar functions. The following embodiments described with reference to the accompanying drawings are exemplary and do not represent all embodiments consistent with the present disclosure. Rather, they are merely examples of devices and methods consistent with some aspects of the present disclosure as detailed in the appended claims.

A control method according to the embodiments of the present disclosure is applied to an electronic device and a stylus. The electronic device may be a mobile phone, a tablet computer, a notebook computer or other devices that can interact with the stylus, and the stylus may also be called a handwriting pen or an active pen. The electronic device is coupled to the stylus. In an embodiment, the electronic device is coupled to the stylus via Bluetooth.

In the embodiments of the present disclosure, wireless communication between the electronic device and the stylus is susceptible to noise interference, which leads to abnormal functions of the stylus. For example, noise may be generated when the electronic device is coupled to a charger, or may be generated when the electronic device is in contact with other electronic devices, or may be environmental noise in the environment where the electronic device is located. Consequently, noise detection is required during wireless communication between the electronic device and the stylus. When noise is detected, parameters that affect the wireless communication between the stylus and the electronic device are adjusted to reduce influence of noise on the wireless communication between the stylus and the electronic device, thereby improving the anti-interference ability of the stylus and avoiding abnormal functions of the stylus.

FIG. 1 is a flowchart of a control method according to an embodiment of the present disclosure, which is executed by an electronic device. Referring to FIG. 1, the control method includes the following steps.

In step S101, first noise is detected, and at least one control parameter is determined. The first noise is noise affecting wireless communication between a stylus and an electronic device, and the at least one control parameter includes a parameter controlling the wireless communication between the stylus and the electronic device.

In the embodiments of the present disclosure, interaction between the stylus and the electronic device is realized through wireless communication. When the first noise affecting the wireless communication between the stylus and the electronic device is detected, the interaction between the stylus and the electronic device is affected. For example, the stylus sends a coding signal to the electronic device, and the electronic device performs corresponding operations according to the received coding signal. When the first noise exists, the first noise will interfere with the coding signal, thus causing the electronic device to receive the wrong signal, and further causing problems in the interaction between the stylus and the electronic device. For example, the first noise is noise generated when an electronic device is coupled to a charger, or noise generated when the electronic device is in contact with other electronic devices, or environmental noise in the environment where the electronic device is located.

When the electronic device detects the first noise, it means that the stylus has been affected by the noise, so it is necessary to determine the control parameter to be adjusted. The control parameter includes a parameter for controlling the wireless communication between the stylus and the electronic device. The control parameter may be voltage or frequency, and the voltage is the voltage when the stylus outputs signals. The greater the voltage, the stronger the anti-interference ability of the stylus, and the smaller the voltage, the weaker the anti-interference ability of the stylus. The frequency is the frequency at which the stylus sends signals. The less similar the frequency is to the frequency of noise, the stronger the anti-interference ability of the stylus is, and the more similar the frequency is to the frequency of noise, the weaker the anti-interference ability of the stylus is. According to actual demands, at least one of voltage or frequency can be used as the control parameter to be adjusted, that is, the control parameter to be adjusted is voltage, or the control parameter to be adjusted is frequency, or the control parameter to be adjusted is voltage and frequency.

In step S102, first indication information is sent to the stylus. The first indication information includes at least one parameter value, each parameter value corresponding to one of the at least one control parameter, and the first indication information is configured to adjust the at least one control parameter to the corresponding parameter value.

After determining at least one control parameter, the parameter value corresponding to each control parameter is determined, that is, the voltage value corresponding to the voltage is determined, and/or the frequency value corresponding to the frequency is determined. Then, the first indication information is sent to the stylus. The first indication information includes the determined parameter value, and the first indication information is configured to adjust at least one control parameter to the corresponding parameter value. For the stylus, the stylus receives the first indication information and adjusts at least one control parameter to the corresponding parameter value. When the first indication information includes a frequency value, the stylus adjusts the frequency to the frequency value. When the first indication information includes a voltage value, the stylus adjusts the voltage to the voltage value. When the first indication information includes a voltage value and a frequency value, the stylus adjusts the frequency to the frequency value and the voltage to the voltage value.

In step S103, the wireless communication between the stylus and the electronic device is controlled in response to the adjusted control parameter.

The control parameter is used to control the wireless communication between the stylus and the electronic device. After the electronic device sends the first indication information to the stylus, the stylus will adjust the corresponding control parameter according to the first indication information. For the electronic device, the electronic device needs to control the wireless communication between the stylus and the electronic device according to the adjusted control parameter. For example, when the frequency is adjusted, the stylus sends a signal according to the adjusted frequency, and the electronic device receives the signal sent by the stylus according to the adjusted frequency. When the voltage is adjusted, the stylus outputs a signal according to the adjusted voltage.

In the control method according to the embodiments of the present disclosure, the electronic device detects the first noise and determines the at least one control parameter. The first noise affects the wireless communication between the stylus and the electronic device, and the control parameter include the parameter for controlling the wireless communication between the stylus and the electronic device. The first indication information is sent to the stylus. The first indication information indicates the at least one parameter value, and each parameter value corresponds to one of the at least one control parameter. The stylus adjusts the at least one control parameter to the corresponding parameter value. Then, the wireless communication between the stylus and the electronic device is conducted based on the adjusted control parameter. By adjusting the parameter that affects the wireless communication between the stylus and electronic device, the influence of noise on the wireless communication between the stylus and electronic device is reduced, improving the anti-interference ability of the stylus and avoiding abnormal functions of the stylus.

Figure 2:
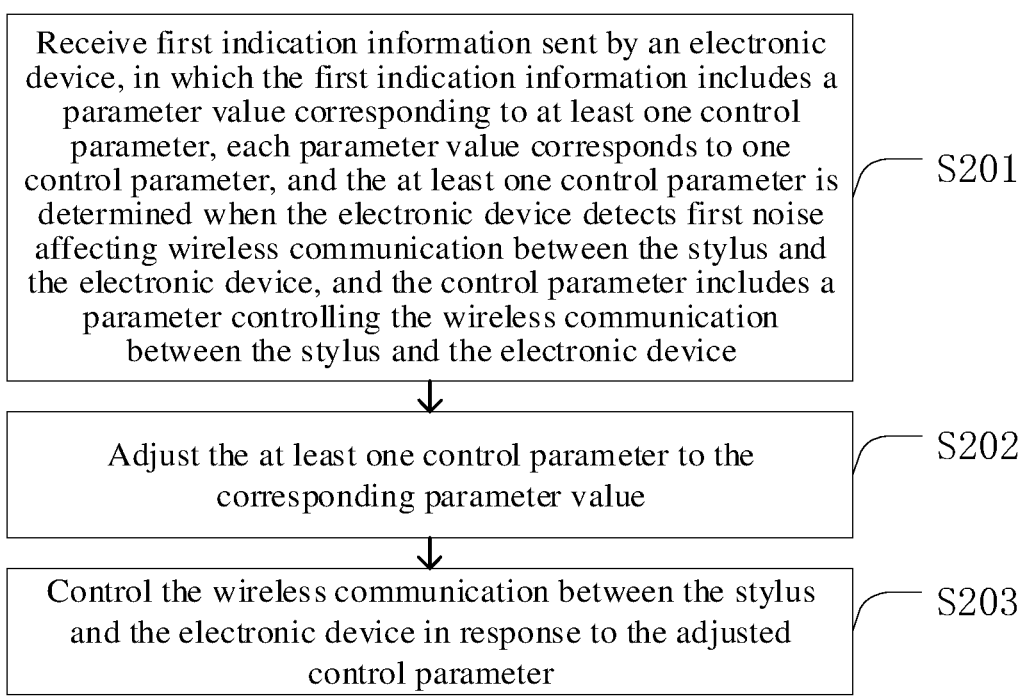
FIG. 2 is a flowchart of a control method according to an embodiment of the present disclosure.

FIG. 2 is a flowchart of a control method according to an embodiment of the present disclosure, which is executed by a stylus. Referring to FIG. 2, the method includes the following steps.

In step S201, first indication information sent by an electronic device is received. The first indication information includes a parameter value corresponding to at least one control parameter, and each parameter value corresponds to one of the at least one control parameter. The at least one control parameter is determined in case that first noise is detected by the electronic device, and the first noise is noise affecting wireless communication between a stylus and the electronic device. The at least one control parameter includes a parameter controlling the wireless communication between the stylus and the electronic device.

In step S202, the at least one control parameter is adjusted to the corresponding parameter value.

In step S203, the wireless communication between the stylus and the electronic device is controlled in response to the adjusted control parameter.

The implementation of steps S201-S203 can refer to the above steps S101-S103 and will not be repeated here.

In the control method according to the embodiments of the present disclosure, the electronic device detects the first noise and determines the at least one control parameter. The first noise affects the wireless communication between the stylus and the electronic device, and the control parameter include the parameter for controlling the wireless communication between the stylus and the electronic device. The first indication information is sent to the stylus. The first indication information indicates the at least one parameter value, and each parameter value corresponds to one of the at least one control parameter. The stylus adjusts the at least one control parameter to the corresponding parameter value according to the received first indication information. Then, the wireless communication between the stylus and the electronic device is conducted based on the adjusted control parameter. By adjusting the parameter that affects the wireless communication between the stylus and electronic device, the influence of noise on the wireless communication between the stylus and electronic device is reduced, improving the anti-interference ability of the stylus and avoiding abnormal functions of the stylus.

In the embodiments of the present disclosure, at least one control parameter includes at least one of voltage or frequency, and sending the first indication information to the stylus includes sending at least one of voltage indication information corresponding to the voltage and frequency indication information corresponding to the frequency to the stylus. The voltage indication information includes a voltage value corresponding to the voltage, the voltage indication information is used to instruct to adjust the voltage to the voltage value, the frequency indication information includes a frequency value corresponding to the frequency, and the frequency indication information is used to instruct to adjust the frequency to the frequency value.

That is, when adjusting the voltage and/or frequency of the stylus, there are the following adjustment modes: (1) first adjusting the voltage and then adjusting the frequency; (2) first adjusting the frequency and then adjusting the voltage; (3) first adjusting the voltage, and then adjusting the frequency when noise is still detected after adjusting the voltage; (4) first adjusting the frequency, and then adjusting the voltage when noise is still detected after adjusting the frequency; (5) adjusting the voltage and frequency at the same time; (6) adjusting the frequency; (7) adjusting the voltage. The above adjustment modes are explained in the following embodiments.

The adjustment mode of first adjusting voltage and then adjusting frequency will be explained by an embodiment shown in FIG. 3. In this adjustment mode, at least one control parameter includes voltage and frequency, and the first indication information includes voltage indication information and frequency indication information.

Figure 3:
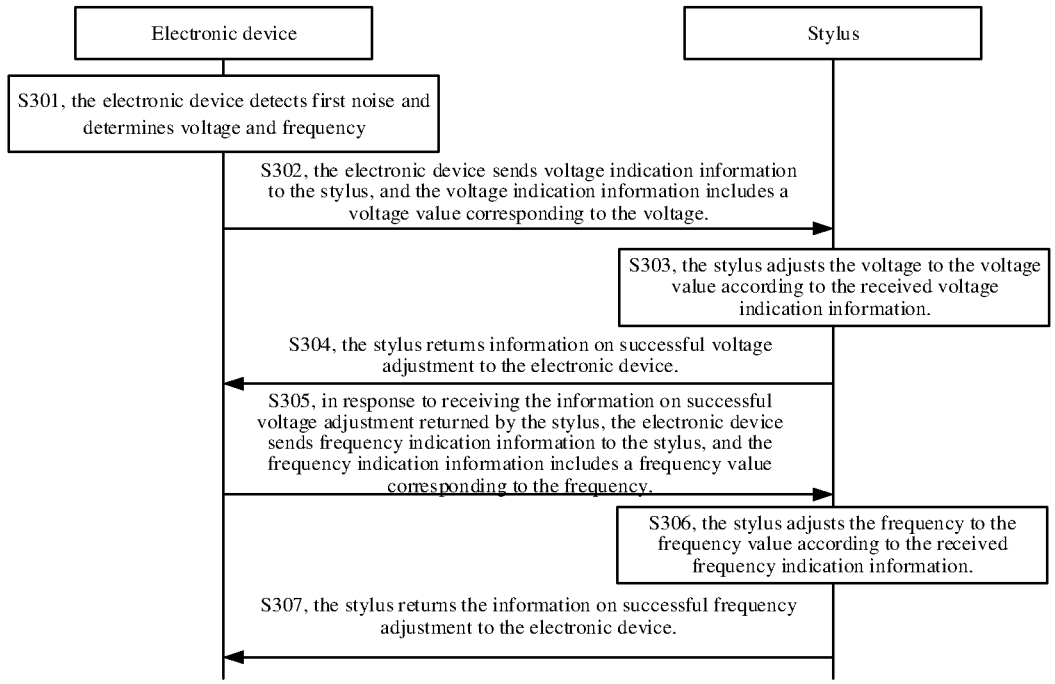
FIG. 3 is a flowchart of a control method according to an embodiment of the present disclosure.

FIG. 3 is a flowchart of a control method according to an embodiment of the present disclosure, which is executed by an electronic device and a stylus. Referring to FIG. 3, the method includes the following steps.

In step S301, the electronic device detects first noise and determines voltage and frequency.

In the embodiments of the present disclosure, when the electronic device detects the first noise, which indicates that the stylus has been affected by the noise, the voltage and frequency are thus determined as the control parameter to be adjusted, so that the stylus can adjust the voltage and frequency. The description of the first noise, voltage and frequency can refer to the above step S101, which will not be repeated here.

In some embodiments, the electronic device performs noise detection to detect the first noise, and obtains a coding signal of the stylus. According to the first noise and the coding signal, a signal-to-noise ratio corresponding to the first noise is determined. When the signal-to-noise ratio is less than a preset threshold, it means that the first noise is large, which affects the coding signal of the stylus and needs to adjust the voltage and frequency of the stylus. That is, the electronic device determines the voltage and frequency when the first noise is detected and the signal-to-noise ratio corresponding to the first noise is less than the preset threshold. The preset threshold is a preset signal-to-noise ratio.

In step S302, the electronic device sends voltage indication information to the stylus, and the voltage indication information includes a voltage value corresponding to the voltage.

The voltage indication information is used to instruct the stylus to adjust the voltage to the voltage value.

In some embodiments, the voltage of the stylus has a plurality of alternative voltage values, and the electronic device selects one voltage value from the plurality of alternative voltage values, and the voltage indication information includes the selected voltage value. Moreover, in order to improve the anti-interference ability of the stylus, it is necessary to increase the voltage of the stylus, so the selected voltage value is greater than the current voltage value of the stylus. For example, the voltage of the stylus can be 40V, 50V and 60V, and if the current voltage of the stylus is 40V, 50V or 60V can be chosen.

In some embodiments, the voltage value is selected from the plurality of alternative voltage values according to the signal-to-noise ratio corresponding to the first noise. For example, the signal-to-noise ratio is less than the preset threshold, and the difference between the signal-to-noise ratio and the preset threshold is large, that is, the first noise is large. At this time, a larger voltage value can be selected from the alternative voltage values that are greater than the current voltage value, or the signal-to-noise ratio is less than the preset threshold, and the difference between the signal-to-noise ratio and the preset threshold is small, that is, the first noise is small. At this time, a smaller voltage value can be selected from the alternative voltage values that are greater than the current voltage value, thus ensuring that the anti-interference ability of the stylus can be enhanced while the In step S303, the stylus adjusts the voltage to the voltage value according to the received voltage indication information.

In step S304, the stylus returns information on successful voltage adjustment to the electronic device.

After receiving the voltage indication information, the stylus determines the voltage value to be adjusted, and adjusts the voltage from the current voltage value to the voltage value included in the voltage indication information. After the voltage is adjusted, the information on successful voltage adjustment is returned to the electronic device, which is used to indicate that the voltage of the stylus has been adjusted. The information on successful voltage adjustment may be ACK (Acknowledgement) or other forms, and the embodiments of the present disclosure does not limit the form of the information on successful voltage adjustment.

It should be noted that if the stylus does not adjust the voltage, it will not return the information on successful voltage adjustment to the electronic device.

In step S305, in response to receiving the information on successful voltage adjustment returned by the stylus, the electronic device sends frequency indication information to the stylus, and the frequency indication information includes a frequency value corresponding to the frequency.

After receiving the information on successful voltage adjustment, the electronic device determines that the stylus has adjusted the voltage, and then sends frequency indication information to the stylus, which includes the frequency value corresponding to the frequency, and the frequency indication information is used to instruct the stylus to adjust the frequency to the frequency value.

In some embodiments, the frequency of the stylus has a plurality of alternative frequency values, and the electronic device selects a frequency value from the plurality of alternative frequency values, and the frequency indication information includes the selected frequency value. Moreover, in order to improve the anti-interference ability of the stylus, the frequency of the stylus needs to be different from that of the first noise, so the selected frequency value needs to be quite different from that of the first noise. For example, the frequency of the stylus can be a, b, c and d, and the current frequency value of the stylus is a, so any one of b, c and d can be selected.

In some embodiments, the frequency values include a tip (tip electrode) frequency value and a ring (ring electrode) frequency value, which may be identical or different.

In step S306, the stylus adjusts the frequency to the frequency value according to the received frequency indication information.

In step S307, the stylus returns the information on successful frequency adjustment to the electronic device.

After receiving the frequency indication information, the stylus determines the frequency value to be adjusted, and adjusts the frequency from the current frequency value to the frequency value included in the frequency indication information. After the frequency is adjusted, the information on successful frequency adjustment is returned to the electronic device, and the information on successful frequency adjustment is used to indicate that the frequency of the stylus has been adjusted. The information on successful frequency adjustment may be ACK (Acknowledgement) or other forms, and the embodiments of the present disclosure does not limit the form of the information on successful frequency adjustment.

In the control method according to the embodiments of the present disclosure, the electronic device detects the first noise, determines the voltage and frequency, and sends the voltage indication information and frequency indication information to the stylus in turn, and the stylus adjusts the voltage and frequency in turn, so as to improve the anti-interference ability of the stylus and avoid abnormal functions of the stylus.

The adjustment mode of first adjusting the frequency and then adjusting the voltage will be explained by an embodiment shown in FIG. 4. In this adjustment mode, at least one control parameter includes voltage and frequency, and the first indication information includes voltage indication information and frequency indication information.

Figure 4:
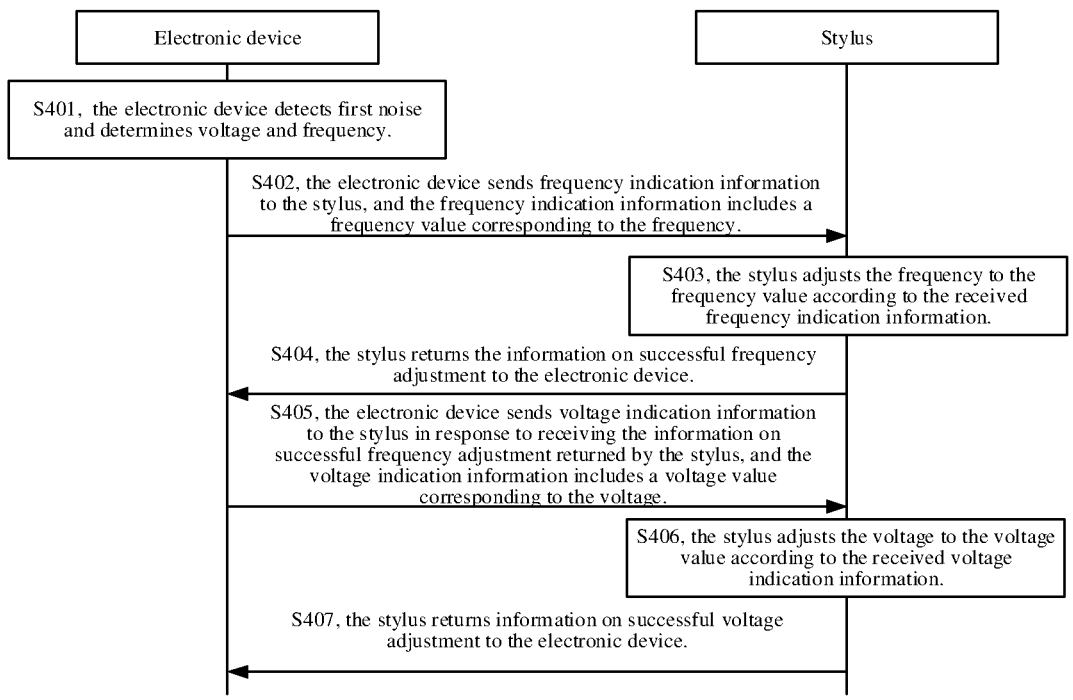
FIG. 4 is a flowchart of a control method according to an embodiment of the present disclosure.

FIG. 4 is a flowchart of a control method according to an embodiment of the present disclosure, which is executed by an electronic device and a stylus. Referring to FIG. 4, the method includes the following steps.

In step S401, the electronic device detects first noise and determines voltage and frequency.

The implementation of step S401 can refer to the above step S301 and will not be repeated here.

In step S402, the electronic device sends frequency indication information to the stylus, and the frequency indication information includes a frequency value corresponding to the frequency.

The frequency indication information is used to instruct the stylus to adjust the frequency to the frequency value.

The way of determining the frequency value in step S402 can refer to the above step S305 and will not be repeated here.

In step S403, the stylus adjusts the frequency to the frequency value according to the received frequency indication information.

In step S404, the stylus returns the information on successful frequency adjustment to the electronic device.

It should be noted that if the stylus does not adjust the frequency, it will not return the information on successful frequency adjustment to the electronic device.

In step S405, the electronic device sends voltage indication information to the stylus in response to receiving the information on successful frequency adjustment returned by the stylus, and the voltage indication information includes a voltage value corresponding to the voltage.

The way of determining the voltage value in step S405 can refer to the above step S302, which will not be described here.

In step S406, the stylus adjusts the voltage to the voltage value according to the received voltage indication information.

In step S407, the stylus returns information on successful voltage adjustment to the electronic device.

In the control method according to the embodiments of the present disclosure, the electronic device detects the first noise, determines the voltage and frequency, and sends the frequency indication information and the voltage indication information to the stylus in turn, and the stylus adjusts the frequency and the voltage in turn, so as to improve the anti-interference ability of the stylus and avoid abnormal functions of the stylus.

Through an embodiment shown in FIG. 5, the adjustment mode of first adjusting the voltage and then adjusting the frequency when noise is still detected after adjusting the voltage will be explained. In this adjustment mode, at least one control parameter includes voltage and frequency, and the first indication information includes voltage indication information and frequency indication information.

Figure 5:
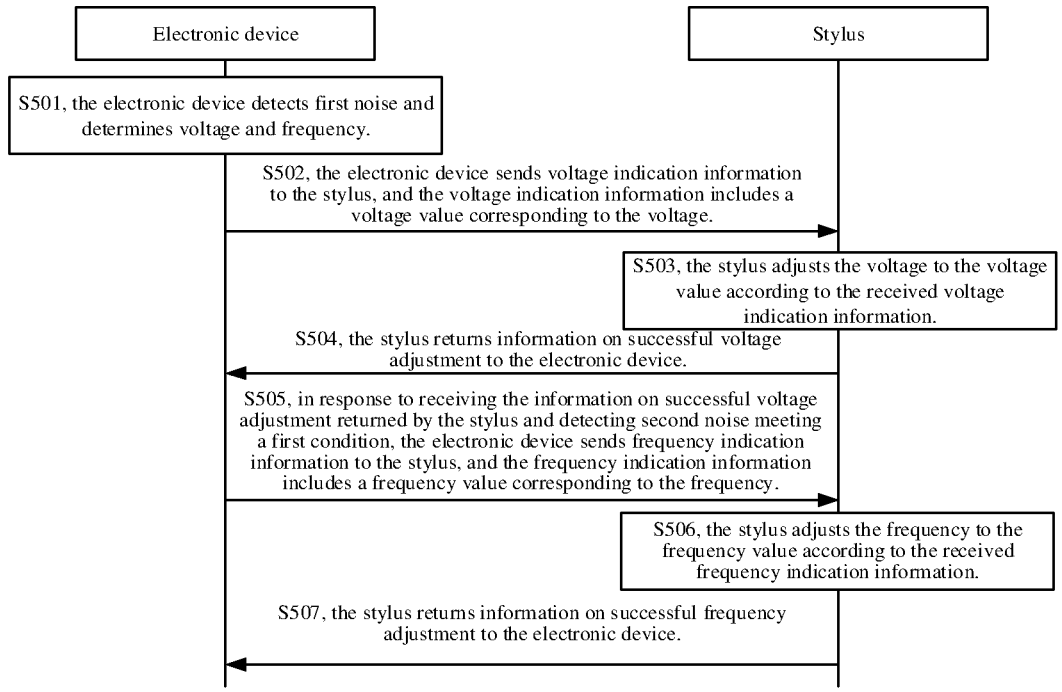
FIG. 5 is a flowchart of a control method according to an embodiment of the present disclosure.

FIG. 5 is a flowchart of a control method according to an embodiment of the present disclosure, which is executed by an electronic device and a stylus. Referring to FIG. 5, the method includes the following steps.

In step S501, the electronic device detects first noise and determines voltage and frequency.

In step S502, the electronic device sends voltage indication information to the stylus, and the voltage indication information includes a voltage value corresponding to the voltage.

In step S503, the stylus adjusts the voltage to the voltage value according to the received voltage indication information.

In step S504, the stylus returns information on successful voltage adjustment to the electronic device.

The implementation of steps S501-S504 can refer to the above steps S301-S304 and will not be repeated here.

In step S505, in response to receiving the information on successful voltage adjustment returned by the stylus and detecting second noise meeting a first condition, the electronic device sends frequency indication information to the stylus, and the frequency indication information includes a frequency value corresponding to the frequency.

In the embodiments of the present disclosure, after receiving the information on successful voltage adjustment, the electronic device performs noise detection again, and determines whether to perform subsequent frequency adjustment according to a result of the noise detection.

In some embodiments, after detecting the second noise, the electronic device obtains a coding signal of the stylus, and determines a signal-to-noise ratio corresponding to the second noise according to the second noise and the coding signal. When the signal-to-noise ratio is less than a preset threshold, it means that the second noise is large, and the stylus is still affected by the noise at this time, so it is necessary to adjust the frequency of the stylus. That is, the electronic device sends frequency indication information to the stylus when the second noise is detected and the first condition is met. The second noise meeting the first condition is that the signal-to-noise ratio corresponding to the second noise is less than the preset threshold.

In some embodiments, the second noise and the first noise may be the same or may be different. If the first noise does not change after detecting the first noise and adjusting the voltage, the detected second noise is the same as the first noise. If the first noise is weakened or enhanced, or new noise is generated after detecting the first noise and adjusting the voltage, the second noise is different from the first noise. However, even if the second noise is different from the first noise, the second noise is noise that affects the wireless communication between the electronic device and the stylus, and the second noise is generated in a similar way to the first noise.

The way of determining the frequency value in step S505 can refer to the above step S305 and will not be repeated here.

In step S506, the stylus adjusts the frequency to the frequency value according to the received frequency indication information.

In step S507, the stylus returns information on successful frequency adjustment to the electronic device.

It should be noted that the embodiments of the present disclosure only performs the step of adjusting the frequency of the stylus when the second noise meeting the first condition is detected, and does not perform the step of adjusting the frequency of the stylus when the second noise is not detected or the detected second noise does not meet the first condition.

In the method according to the embodiments of the present disclosure, the electronic device detects the first noise, determines the voltage and frequency, and sends the voltage indication information to the stylus. The stylus adjusts the voltage first. After the voltage is adjusted, if it is still affected by the noise, the electronic device continues to send the frequency indication information to the stylus, and then the stylus adjusts the frequency, so as to improve the anti-interference ability of the stylus and avoid abnormal functions of the stylus.

Through an embodiment shown in FIG. 6, the adjustment mode of first adjusting the frequency and then adjusting the voltage when noise is still detected after adjusting the frequency will be explained. In this adjustment mode, at least one control parameter includes voltage and frequency, and the first indication information includes voltage indication information and frequency indication information.

Figure 6:
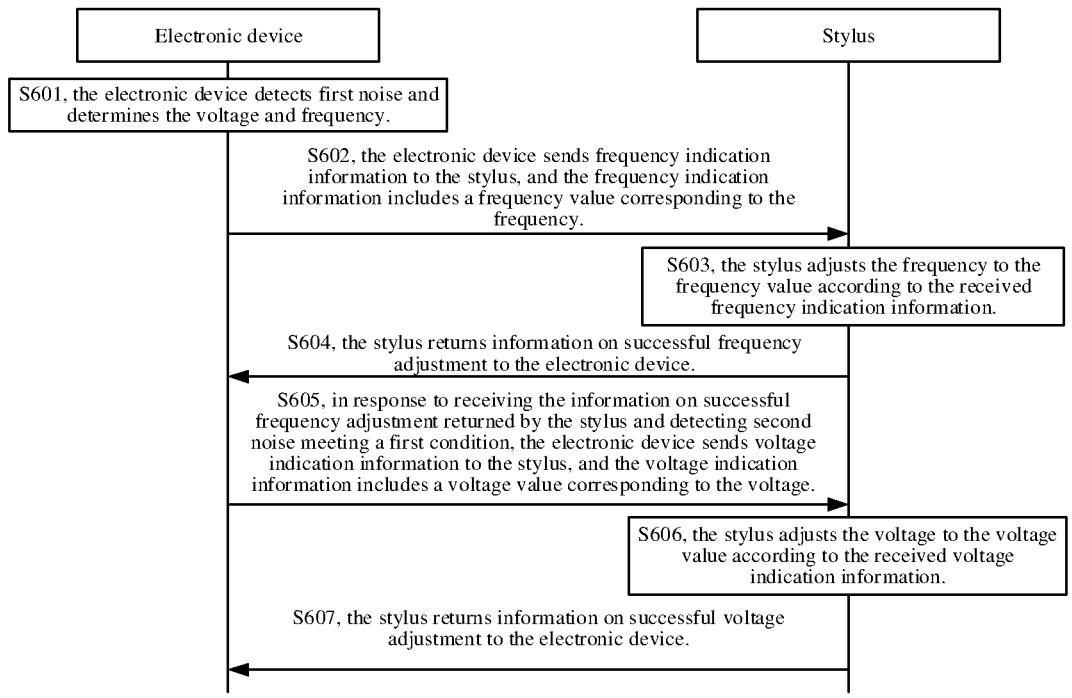
FIG. 6 is a flowchart of a control method according to an embodiment of the present disclosure.

FIG. 6 is a flowchart of a control method according to an embodiment of the present disclosure, which is executed by an electronic device and a stylus. Referring to FIG. 6, the method includes the following steps.

In step S601, the electronic device detects first noise and determines the voltage and frequency.

In step S602, the electronic device sends frequency indication information to the stylus, and the frequency indication information includes a frequency value corresponding to the frequency.

In step S603, the stylus adjusts the frequency to the frequency value according to the received frequency indication information.

In step S604, the stylus returns information on successful frequency adjustment to the electronic device.

The implementation of steps S601-S604 can refer to the above steps S401-S404 and will not be repeated here.

In step S605, in response to receiving the information on successful frequency adjustment returned by the stylus and detecting second noise meeting a first condition, the electronic device sends voltage indication information to the stylus, and the voltage indication information includes a voltage value corresponding to the voltage.

The process of detecting the second noise can refer to the above step S505, which will not be described here.

In step S606, the stylus adjusts the voltage to the voltage value according to the received voltage indication information.

In step S607, the stylus returns information on successful voltage adjustment to the electronic device.

In the method according to the embodiments of the present disclosure, the electronic device detects the first noise, determines the voltage and frequency, and sends the frequency indication information to the stylus. The stylus adjusts the frequency first. After the frequency is adjusted, if it is still affected by the noise, the electronic device continues to send the voltage indication information to the stylus, and then the stylus adjusts the voltage, so as to improve the anti-interference ability of the stylus and avoid abnormal functions of the stylus.

The adjustment mode of adjusting the voltage will be explained through an embodiment shown in FIG. 7. In this adjustment mode, at least one control parameter includes the voltage, and the first indication information includes voltage indication information.

Figure 7:
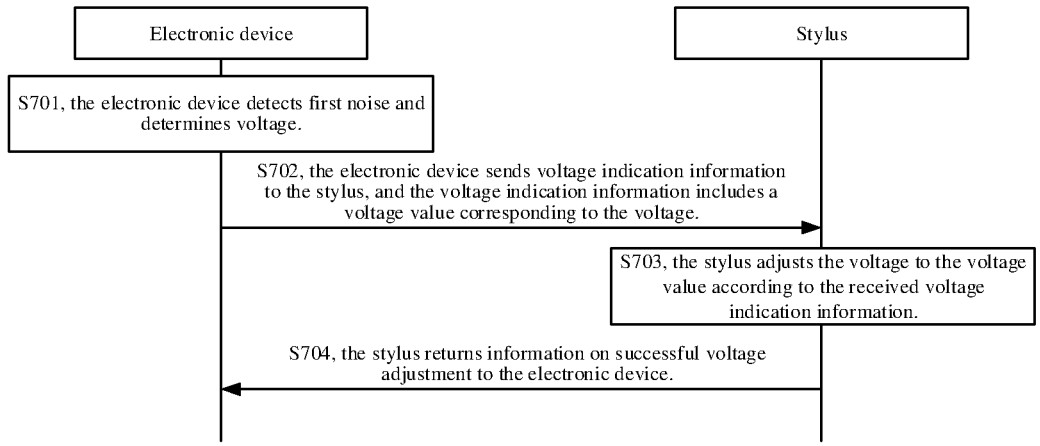
FIG. 7 is a flowchart of a control method according to an embodiment of the present disclosure.

FIG. 7 is a flowchart of a control method according to an embodiment of the present disclosure, which is executed by an electronic device and a stylus. Referring to FIG. 7, the method includes the following steps.

In step S701, the electronic device detects first noise and determines voltage.

In step S702, the electronic device sends voltage indication information to the stylus, and the voltage indication information includes a voltage value corresponding to the voltage.

That is, the electronic device sends first indication information to the stylus, and the first indication information includes a voltage value corresponding to the voltage and is used to instruct the stylus to adjust the voltage to the voltage value.

In step S703, the stylus adjusts the voltage to the voltage value according to the received voltage indication information.

In step S704, the stylus returns information on successful voltage adjustment to the electronic device.

The implementation of steps S701-S704 can refer to the above steps S301-S304 and will not be repeated here.

In the control method according to the embodiments of the present disclosure, the electronic device detects the first noise, determines the voltage, and sends the voltage indication information to the stylus. The stylus adjusts the voltage. As a result, the anti-interference ability of the stylus can be improved and abnormal functions of the stylus can be avoided.

The adjustment mode of adjusting frequency and the adjustment mode of adjusting voltage and frequency will be explained below through an embodiment shown in FIG. 8. In this adjustment mode, at least one control parameter includes frequency, and the first indication information includes frequency indication information.

Figure 8:
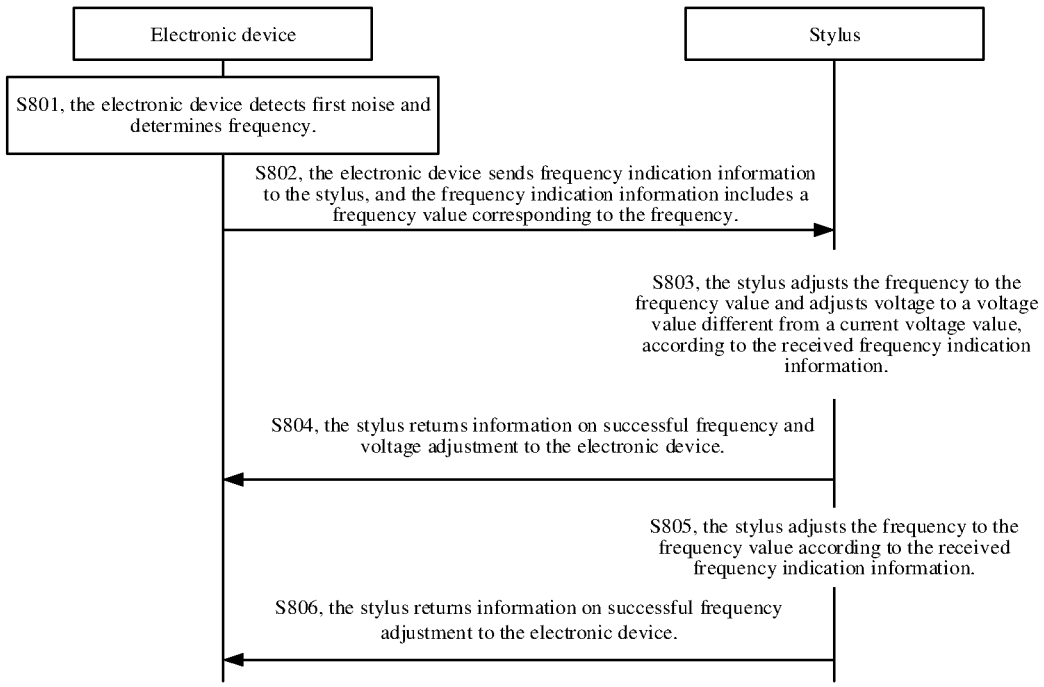
FIG. 8 is a flowchart of a control method according to an embodiment of the present disclosure.

FIG. 8 is a flowchart of a control method according to an embodiment of the present disclosure, which is executed by an electronic device and a stylus. Referring to FIG. 8, the method includes the following steps.

In step S801, the electronic device detects first noise and determines frequency.

In step S802, the electronic device sends frequency indication information to the stylus, and the frequency indication information includes a frequency value corresponding to the frequency.

The frequency indication information is used to instruct the stylus to adjust the frequency to the frequency value.

After the stylus receives the frequency indication information, steps S803 and S804 are executed, or steps S805 and S806 are executed.

In step S803, the stylus adjusts the frequency to the frequency value and adjusts voltage to a voltage value different from a current voltage value, according to the received frequency indication information.

In step S804, the stylus returns information on successful frequency and voltage adjustment to the electronic device.

In steps S803 and S804, after receiving the frequency indication information, the stylus determines that the frequency needs to be adjusted. At this time, the stylus can determine that the interaction with the electronic device is disturbed by noise, and adjust the voltage while adjusting the frequency. The adjusted voltage value is different from the current voltage value and is greater than the current voltage value.

In step S805, the stylus adjusts the frequency to the frequency value according to the received frequency indication information.

In step S806, the stylus returns information on successful frequency adjustment to the electronic device.

In steps S805 and S806, after receiving the frequency indication information, the stylus adjusts the frequency without adjusting the voltage.

In the control method according to the embodiments of the present disclosure, the electronic device detects the first noise, determines the frequency, and sends frequency indication information to the stylus. The stylus adjusts the frequency, or adjusts the frequency and voltage, so as to improve the anti-interference ability of the stylus and avoid abnormal functions of the stylus.

It should be noted that in the above embodiment shown in FIG. 8, when the frequency and voltage are adjusted at the same time, frequency indication information is sent, and after the stylus receives the frequency indication information, it is determined that the current wireless communication between the electronic device and the stylus is affected, and the voltage is adjusted while adjusting the frequency. In another embodiment, in order to adjust the frequency and voltage at the same time, the electronic device can also send frequency indication information and voltage indication information to the stylus at the same time, and the stylus adjusts the frequency to a corresponding frequency value and the voltage to a corresponding voltage value according to the received frequency indication information and voltage indication information.

It should be noted that for the frequency adjustment shown in the above embodiments, in some embodiments, after the electronic device receives the information on successful frequency adjustment returned by the stylus, the downlink frequency is adjusted to the frequency value included in the frequency indication information in response to receiving the information on successful frequency adjustment, so that the downlink frequency of the electronic device is consistent with the frequency of the stylus, so that the electronic device can accurately receive the operation of the stylus.

It should be further noted that, in view of the above-mentioned various adjustment modes, when actually adjusting the voltage and/or frequency of the stylus, an appropriate adjustment mode can be selected according to actual needs.

For example, the frequency of the detected first noise is close to the current frequency of the stylus. In this case, the interference of noise can be reduced more quickly by adjusting the frequency. Therefore, the frequency of the stylus can be adjusted preferentially, for example, one of (1) first adjusting the frequency and then adjusting the voltage, (2) adjusting the frequency, or (3) adjusting the voltage and frequency simultaneously, can be selected.

As another example, the frequency of the detected first noise is close to the current frequency of the stylus, and the power of the stylus is low. In this case, it is necessary to save as much power as possible and not adjust the voltage as much as possible, for example, one of (1) first adjusting the frequency, and then adjusting the voltage after adjusting the frequency, or (2) adjusting the frequency, can be selected.

As another example, in order to reduce modification on settings of the electronic device, that is, not to modify the downlink frequency of the electronic device, in this case, one of (1) adjusting the voltage, (2) first adjusting the voltage, and then adjusting the frequency when noise is still detected after adjusting the voltage, can be selected preferentially.

In some embodiments, after the voltage and/or frequency of the stylus is adjusted by the above-mentioned embodiments, when the noise disappears or the noise is reduced to not affect the use of the stylus, it is necessary to readjust the voltage and/or frequency of the stylus to a main voltage and/or a main frequency. The process of readjusting the voltage and frequency of the stylus to the main voltage and the main frequency will be described below through an embodiment shown in FIG. 9.

Figure 9:
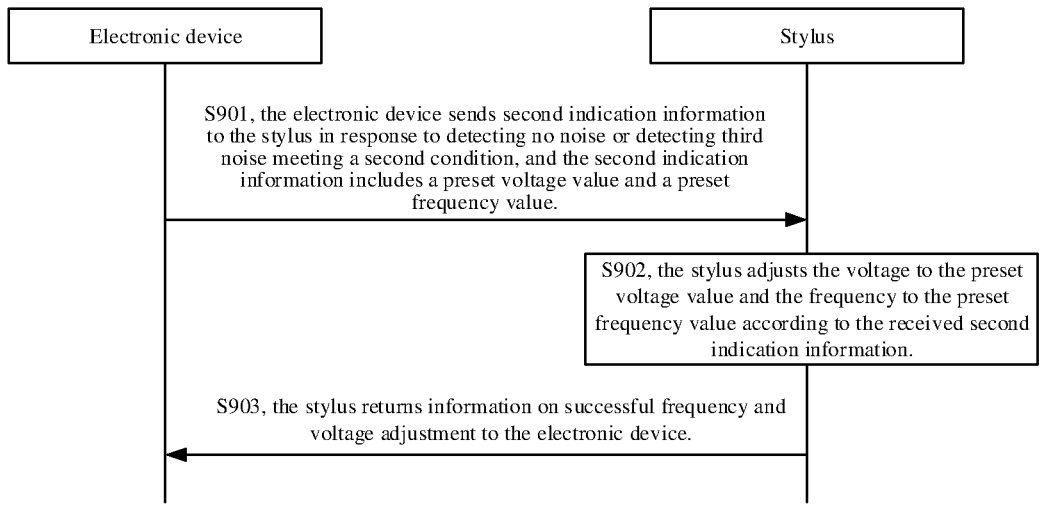
FIG. 9 is a flowchart of a control method according to an embodiment of the present disclosure.

FIG. 9 is a flowchart of a control method according to an embodiment of the present disclosure, which is executed by an electronic device and a stylus. Referring to FIG. 9, the method includes the following steps.

In step S901, the electronic device sends second indication information to the stylus in response to detecting no noise or detecting third noise meeting a second condition, and the second indication information includes a preset voltage value and a preset frequency value.

The second indication information is used to instruct the stylus to adjust voltage to the preset voltage value and adjusts frequency to a preset frequency value, and the third noise meeting the second condition is that a signal-to-noise ratio corresponding to the third noise is greater than or equal to a preset threshold. The preset voltage value is the main voltage and the preset frequency value is the main frequency.

In step S902, the stylus adjusts the voltage to the preset voltage value and the frequency to the preset frequency value according to the received second indication information.

In step S903, the stylus returns information on successful frequency and voltage adjustment to the electronic device.

It should be noted that in another embodiment, if the stylus adjusts the frequency, the frequency is adjusted to the preset frequency value, and if the stylus adjusts the voltage, the voltage is adjusted to the preset frequency value.

In the embodiment of the present disclosure, after adjusting the voltage and/or frequency of the stylus, when the noise disappears or is reduced to an extent at which the noise does not affect the use of the stylus, the voltage and/or frequency of the stylus is readjusted to the main voltage and/or main frequency so as not to affect the subsequent use of the stylus.

It should be noted that before adjusting the voltage and/or frequency through any of the above-mentioned embodiments in FIGS. 3-8, if the electronic device does not detect noise, the electronic device does not need to perform the step of sending the first indication information, and the stylus and the electronic device can communicate wirelessly according to the preset voltage value and the preset frequency value. That is, the preset voltage value and the preset frequency value are default values in case of no noise interference; and the preset voltage value is adjusted to another voltage value and/or the preset frequency value is adjusted to another frequency value after being affected by noise interference.

In some embodiments, the stylus can be coupled to different electronic devices. It may happen that the stylus is coupled to the electronic device when the electronic device sends the first indication information to the stylus, but when the stylus receives the first indication information, that is, when the frequency and/or voltage are about to be adjusted, the stylus is switched to be coupled to other electronic devices. In this case, it is not necessary to adjust the frequency and/or voltage according to the first indication information. Therefore, before adjusting the frequency and/or voltage of the stylus, it is necessary to judge whether the stylus is still coupled to the electronic device. The embodiment in this case will be explained by an embodiment shown in FIG. 10.

Figure 10:
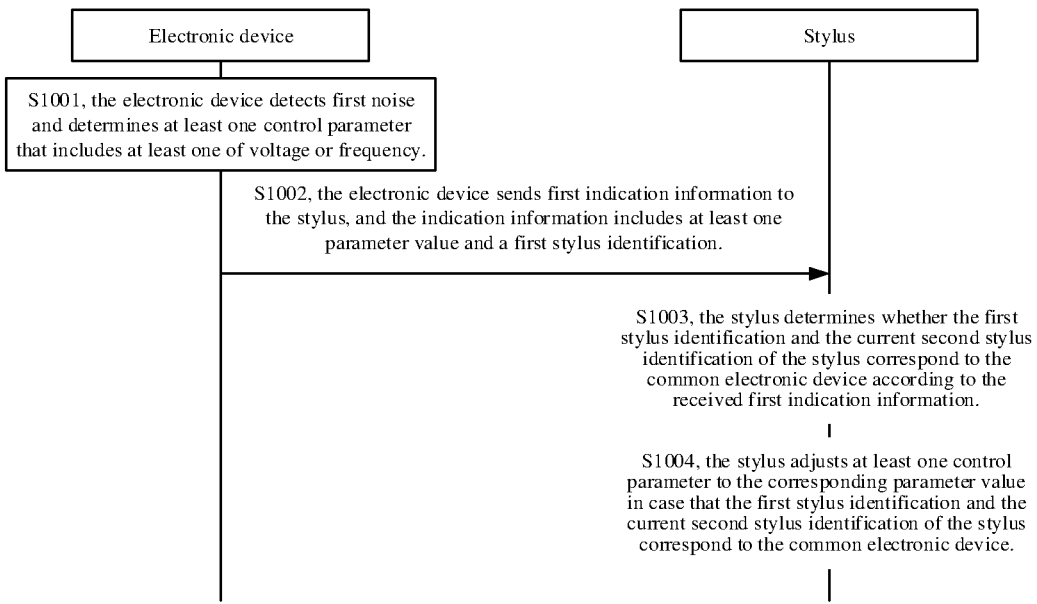
FIG. 10 is a flowchart of a control method according to an embodiment of the present disclosure.

FIG. 10 is a flowchart of an control method according to an embodiment of the present disclosure, which is executed by an electronic device and a stylus. Referring to FIG. 10, the method includes the following steps.

In step S1001, the electronic device detects first noise and determines at least one control parameter that includes at least one of voltage or frequency.

The implementation of step S1001 can refer to step S101 and will not be repeated here.

In step S1002, the electronic device sends first indication information to the stylus, and the indication information includes at least one parameter value and a first stylus identification.

The first stylus identification is the stylus identification when determining at least one control parameter, and the first indication information is used to instruct the stylus to adjust at least one control parameter to a corresponding parameter value when the first stylus identification and a current stylus identification of the stylus correspond to a common electronic device, in which the current stylus identification of the stylus is a second stylus identification. The electronic device corresponds to at least one stylus identification, and the stylus identification of the electronic device is consistent with the stylus identification of the stylus when the electronic device is coupled to the stylus.

In step S1003, the stylus determines whether the first stylus identification and the second stylus identification of the stylus correspond to the common electronic device according to the received first indication information.

The first stylus identification and the second stylus identification may be identical or different. It is determined that the first stylus identification and the second stylus identification correspond to the common electronic device when the first stylus identification and the second stylus identification are the same. When the first stylus identification and the second stylus identification are different, the first stylus identification and the second stylus identification may correspond to the common electronic device or different electronic devices.

In some embodiments, the stylus has stored therein a corresponding relationship between the stylus identification and the device identification of the electronic device, and the stylus inquires whether the first stylus identification and the second stylus identification correspond to the common electronic device according to the corresponding relationship.

For example, a tablet computer corresponds to stylus identifications ID0 and ID1. When the stylus identification is ID0, the tablet computer detects first noise, and then sends first indication information to the stylus, which includes the parameter value to be adjusted and ID0. In the process of sending the first indication information, the foreground application displayed on the tablet computer is switched, and the frame rate corresponding to the switched foreground application is different from that of the foreground application before switching. At this time, the stylus identification is also correspondingly switched to ID1, and the stylus identification of the stylus is also switched to ID1 through uplink (a port type). When the stylus receives the first indication information including ID0, ID0 is different from ID1, but it can be determined that ID0 and ID1 correspond to the pad.

In step S1004, the stylus adjusts at least one control parameter to the corresponding parameter value in case that the first stylus identification and the second stylus identification of the stylus correspond to the common electronic device.

In another embodiment, the stylus does not adjust the voltage and/or frequency in case that the first stylus identification and the second stylus identification correspond to different electronic devices.

In the control method according to the embodiments of the present disclosure, the electronic device detects first noise, determines at least one control parameter, and sends first indication information to the stylus, in which the first indication information indicates at least one parameter value and a first stylus identification. The stylus will adjust at least one control parameter to a corresponding parameter value in case that the first stylus identification and the second stylus identification of the stylus correspond to the common electronic device. By sending the voltage value of the voltage and/or the frequency value of the frequency to the stylus, the stylus can adjust the voltage and/or frequency, so as to improve the anti-interference ability of the stylus and avoid abnormal functions of the stylus. Moreover, by comparing whether the stylus identification comes from the common electronic device, it can avoid misoperation when the stylus is coupled to other electronic devices.

It should be noted that the embodiment shown in FIG. 10 can be combined with the above-mentioned embodiments shown in FIGS. 3-9, that is, in the above-mentioned embodiments shown in FIGS. 3-9, the voltage indication information, frequency indication information and second indication information sent by the electronic device can also include a first stylus identification. When the stylus receives voltage indication information, frequency indication information or second indication information, at least one control parameter is adjusted to the corresponding parameter value in case that the first stylus identification and the second stylus identification of the stylus correspond to the common electronic device.

In some embodiments, the electronic device includes a touch firmware unit, a driving unit and a Bluetooth unit. When the electronic device sends indication information to the stylus or receives information on successful adjustment returned by the stylus, the information needs to go through the control firmware unit, the driving unit and the Bluetooth unit. The operations performed by the touch firmware unit, the driving unit and the Bluetooth unit will be described below through an embodiment shown in FIG. 11.

Figure 11:
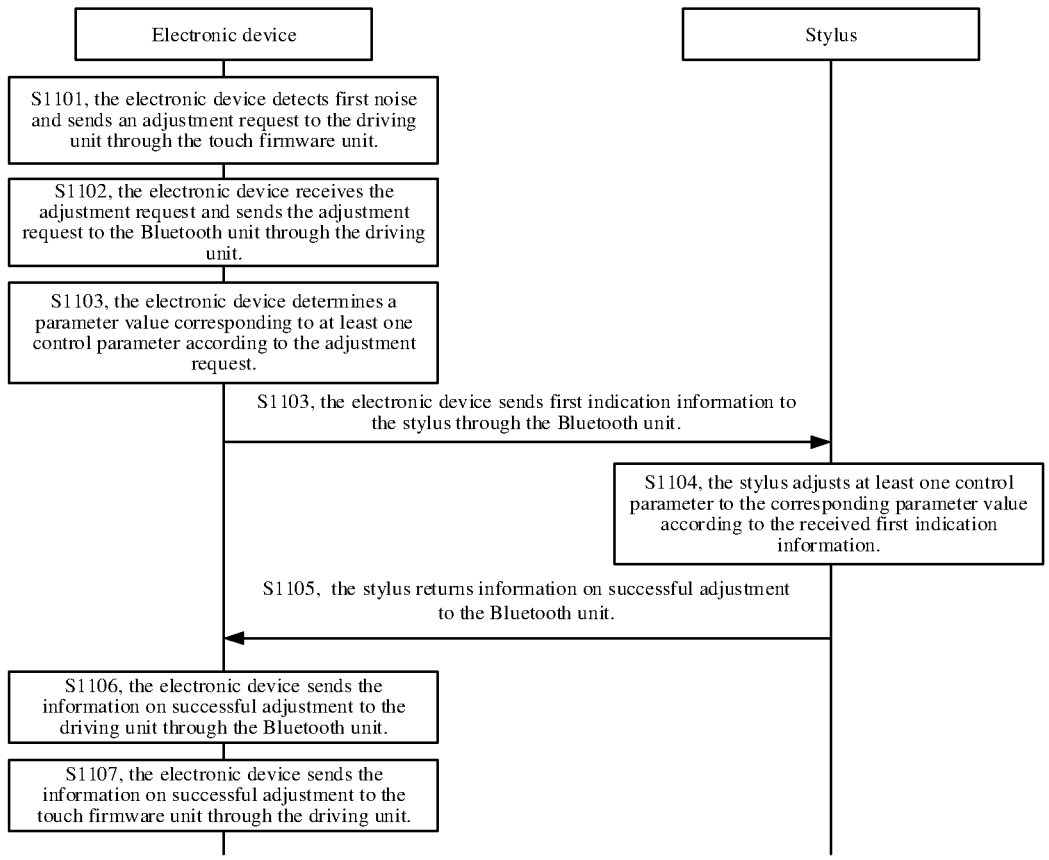
FIG. 11 is a flowchart of a control method according to an embodiment of the present disclosure.

FIG. 11 is a flowchart of a control method according to an embodiment of the present disclosure, which is executed by an electronic device and a stylus. Referring to FIG. 11, the method includes the following steps.

In step S1101, the electronic device detects first noise and sends an adjustment request to the driving unit through the touch firmware unit.

The adjustment request carries a parameter identification corresponding to at least one control parameter, and the parameter identification represents a parameter value corresponding to the control parameter. Different parameter identifications represent different parameter values.

In step S1102, the electronic device receives the adjustment request and sends the adjustment request to the Bluetooth unit through the driving unit.

In step S1103, the electronic device determines a parameter value corresponding to at least one control parameter according to the adjustment request and sends first indication information to the stylus through the Bluetooth unit.

In the embodiments of the present disclosure, the touch firmware unit initiates the adjustment request, and the electronic device needs to interact with the stylus through the Bluetooth unit. Therefore, after the touch firmware unit initiates the adjustment request, the adjustment request is sent to the Bluetooth unit through the driving unit inside the electronic device. In the process of transmission inside the electronic device, in order to reduce the amount of data transmitted, the adjustment request carries the parameter identification, and then the parameter value to be sent is determined by the Bluetooth module according to the parameter identification.

For example, see Table 1 below.

TABLE 1

| | Frequency number | Specific frequency | Touch pen operation |
|---|---|---|---|
| Main frequency | 0 | a | Return to the main frequency a+ return to the main voltage 40 V |
| Hopping frequency | 1 | b | Hop to frequency b+ switch to anti-noise voltage 60 V |
| | 2 | c | Hop to frequency c+ switch to anti-noise voltage 60 V |
| | 3 | d | Hop to frequency d+ switch to anti-noise voltage 60 V |

The frequency number in Table 1 is the parameter identification, the frequency number of the main frequency of the stylus is 0, the main frequency is a, and the hopping frequency is other frequencies that can be adjusted by the stylus. In the process of sending the adjustment request, the adjustment request only needs to carry the frequency number, but does not need to carry the specific frequency. Finally, the specific frequency is determined through the Bluetooth module according to the relationship shown in Table 1.

It should be noted that the stylus operation in Table 1 refers to that in the case of adjusting voltage and frequency at the same time, when the frequency number is 0, the stylus will adjust the frequency to the main frequency a and switch the voltage to 40V. When the frequency number is 1, the stylus will send the frequency b, the stylus will adjust the frequency to the frequency b and switch the voltage to 60V, and the same is for others.

It should be noted that in another embodiment, the driving unit receives the adjustment request and sends the parameter identification carried by the adjustment request to the Bluetooth unit, and the Bluetooth unit determines the parameter value corresponding to at least one control parameter according to the parameter identification and sends the first indication information to the stylus.

In step S1104, the stylus adjusts at least one control parameter to the corresponding parameter value according to the received first indication information.

In some embodiments, the stylus receives the first indication information through the Bluetooth unit of the stylus.

In step S1105, the stylus returns information on successful adjustment to the Bluetooth unit.

In step S1106, the electronic device sends the information on successful adjustment to the driving unit through the Bluetooth unit.

In step S1107, the electronic device sends the information on successful adjustment to the touch firmware unit through the driving unit.

In some embodiments, when the electronic device sends the information on successful adjustment to the driving unit through the Bluetooth unit, it also needs to send the adjusted parameter value of the stylus, that is, send the adjusted stylus voltage value and/or frequency value, so that the touch firmware unit can know the adjusted stylus voltage value and/or frequency value.

In some embodiments, in case that the stylus adjusts the frequency to the frequency value included in the first indication information, the downlink frequency is adjusted to the frequency value by the touch firmware unit.

In the embodiments of the present disclosure, after the first noise is detected by the touch firmware unit, the voltage value and/or frequency value of the voltage are sent to the stylus through the interaction between the touch firmware unit, the driving unit and the Bluetooth unit in the electronic device, so that the stylus can adjust the voltage and/or frequency, so as to improve the anti-interference ability of the stylus and avoid abnormal functions of the stylus. Moreover, the parameter identification rather than the specific parameter value is transmitted inside the electronic device, which can reduce the amount of data transmitted.

Figure 12:
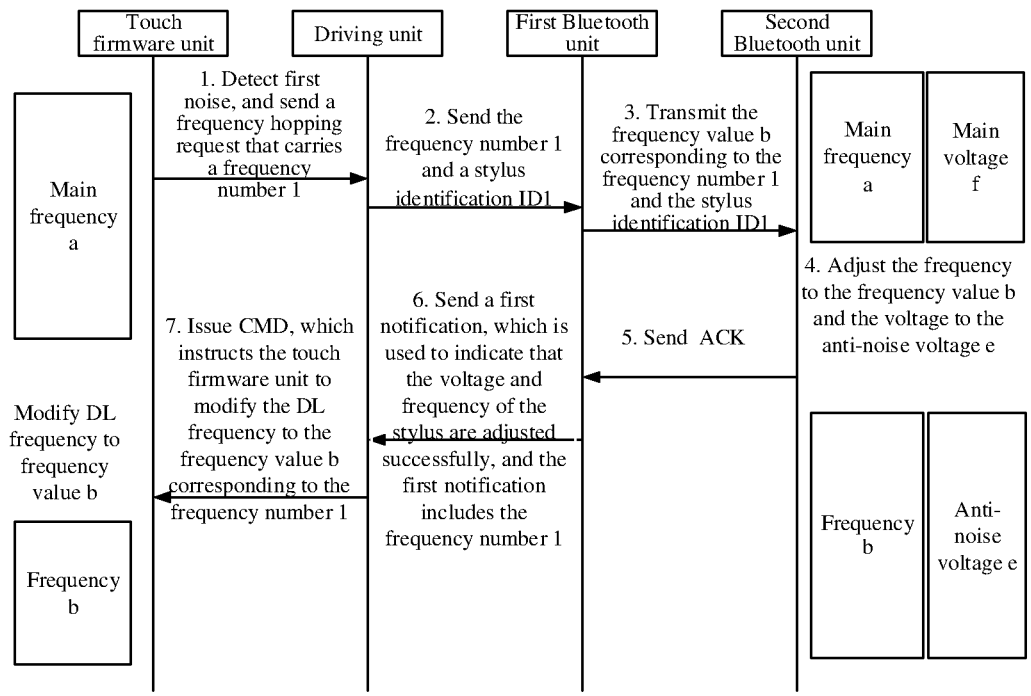
FIG. 12 is a flowchart of a control method according to an embodiment of the present disclosure.
Figure 13:
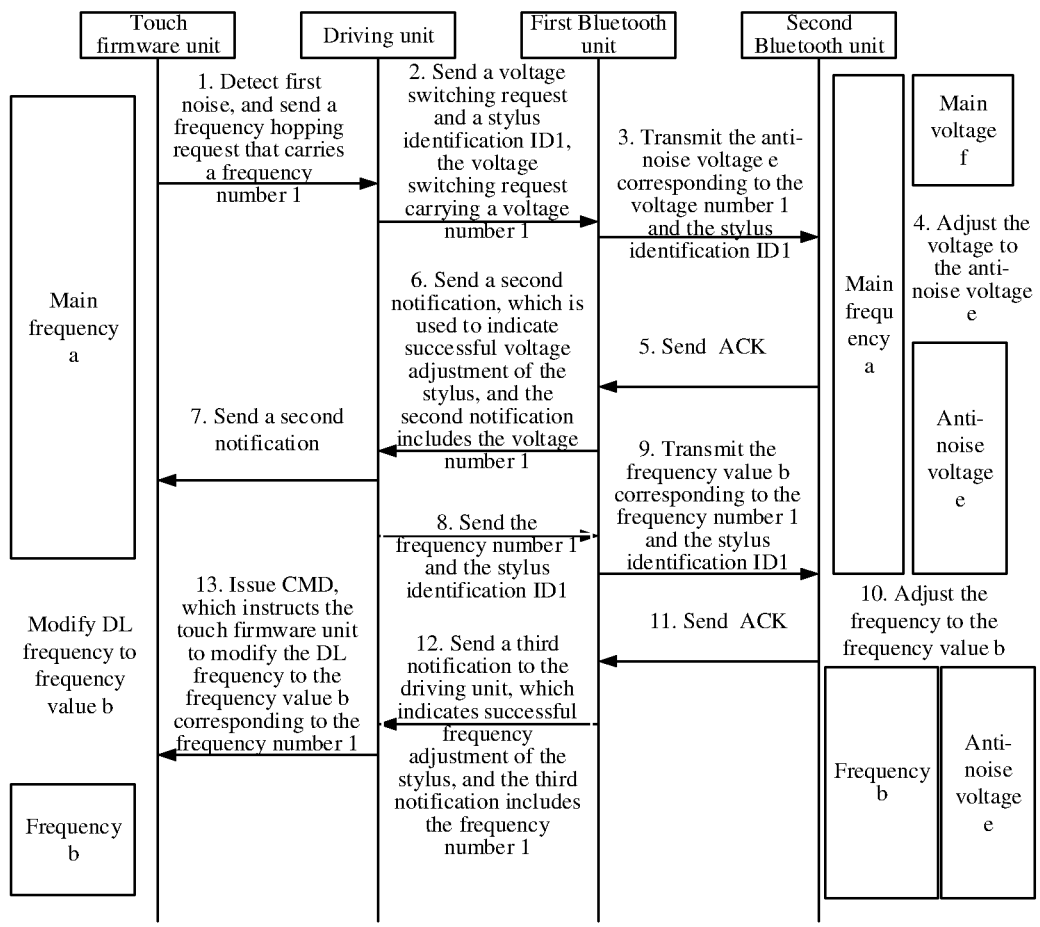
FIG. 13 is a flowchart of a control method according to an embodiment of the present disclosure.
Figure 14:
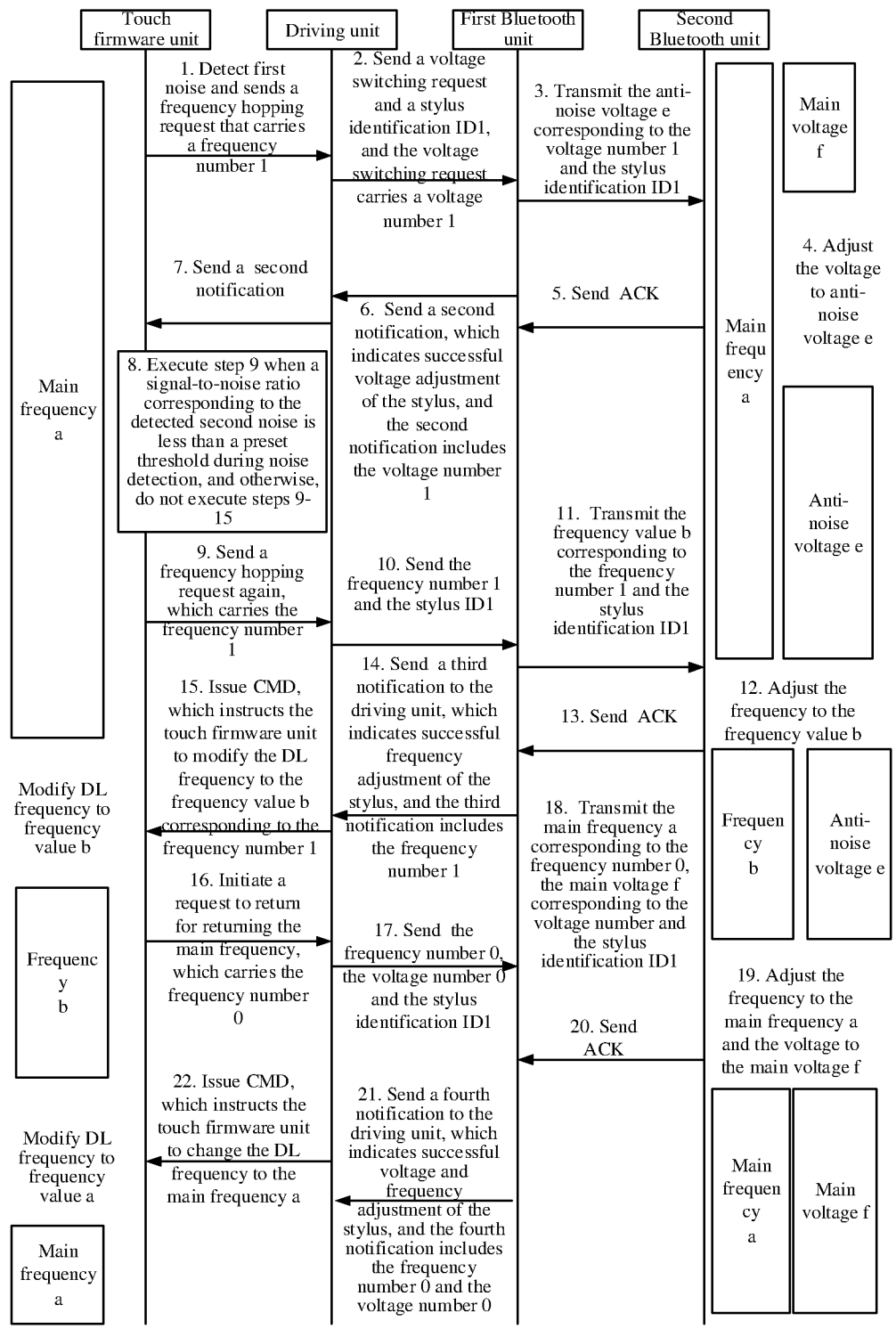
FIG. 14 is a flowchart of a control method according to an embodiment of the present disclosure.

The process of adjusting voltage and frequency at the same time, the process of first adjusting voltage and then adjusting frequency, and the process of first adjusting voltage and then adjusting frequency when noise is detected again are illustrated by the embodiments shown in FIGS. 12-14.

In an example, the process of adjusting voltage and frequency at the same time is shown in FIG. 12, and includes the following steps.

The touch firmware unit detects first noise and sends a frequency hopping request to the driving unit, the frequency hopping request carrying a frequency number 1. The frequency hopping request is equivalent to the adjustment request, and the frequency number is equivalent to the parameter identification.

The driving unit sends the frequency number 1 and a stylus identification ID1 to the first Bluetooth unit. The first Bluetooth unit is the Bluetooth unit of electronic device, and the stylus identification is determined by the driving unit according to the current display frame rate.

The first Bluetooth unit transmits the frequency value b corresponding to the frequency number 1 and the stylus identification ID1 to the second Bluetooth unit. The second Bluetooth unit is the Bluetooth unit of the stylus. The first Bluetooth unit transmits the frequency value b and the stylus identification ID1 to the second Bluetooth unit, which may be that the first Bluetooth unit sends the first indication information to the second Bluetooth unit, and the first indication information includes the frequency value b and the stylus identification ID1.

The second Bluetooth unit receives the frequency value b and the stylus identification ID1, and adjusts the frequency to the frequency value b and the voltage to the anti-noise voltage e when the stylus identification ID1 and the current stylus identification of the stylus correspond to the common electronic device.

The second Bluetooth unit sends the ACK to the first Bluetooth unit.

After receiving the ACK, the first Bluetooth unit sends a first notification to the driving unit, which indicates that the voltage and frequency adjustment of the stylus are successful, and the first notification includes the frequency number 1.

The driving unit issues a command prompt (CMD) to the touch firmware unit, which instructs the touch firmware unit to modify the DL (downlink) frequency to the frequency value b corresponding to the frequency number 1.

In an example, the process of first adjusting the voltage and then adjusting the frequency is shown in FIG. 13, and includes the following steps.

The touch firmware unit detects first noise and sends a frequency hopping request to the driving unit, the frequency hopping request carrying a frequency number 1.

The driving unit sends a voltage switching request and a stylus identification ID1 to the first Bluetooth unit, and the voltage switching request carries a voltage number 1.

The first Bluetooth unit transmits the anti-noise voltage e corresponding to the voltage number 1 and the stylus identification ID1 to the second Bluetooth unit.

The second Bluetooth unit receives the anti-noise voltage e and the stylus identification ID1, and adjusts the voltage to the anti-noise voltage e when the stylus identification ID1 and the current stylus identification of the stylus correspond to the common electronic device.

The second Bluetooth unit sends ACK to the first Bluetooth unit.

After receiving the ACK, the first Bluetooth unit sends a second notification to the driving unit, which indicates that the voltage adjustment of the stylus is successful, and the second notification includes the voltage number 1.

The driving unit sends a second notification to the touch firmware unit.

The driving unit sends the frequency number 1 and the stylus identification ID1 to the first Bluetooth unit.

The first Bluetooth unit transmits the frequency value b corresponding to the frequency number 1 and the stylus identification ID1 to the second Bluetooth unit.

The second Bluetooth unit receives the frequency value b and the stylus identification ID1, and adjusts the frequency to the frequency value b when the stylus identification ID1 and the current stylus identification of the stylus correspond to the common electronic device.

The second Bluetooth unit sends ACK to the first Bluetooth unit.

After receiving the ACK, the first Bluetooth unit sends a third notification to the driving unit, which indicates that the frequency adjustment of the stylus is successful, and the third notification includes the frequency number 1.

The driving unit issues a CMD to the touch firmware unit, which instructs the touch firmware unit to modify the DL frequency to the frequency value b corresponding to the frequency number 1.

In an example, the process of first adjusting the voltage and then adjusting the frequency when noise is detected again is shown in FIG. 14, and includes the following steps.

The touch firmware unit detects first noise and sends a frequency hopping request to the driving unit, the frequency hopping request carrying a frequency number 1.

The driving unit sends a voltage switching request and a stylus identification ID1 to the first Bluetooth unit, and the voltage switching request carries a voltage number 1.

The first Bluetooth unit transmits the anti-noise voltage e corresponding to the voltage number 1 and the stylus identification ID1 to the second Bluetooth unit.

The second Bluetooth unit receives the anti-noise voltage e and the stylus identification ID1, and adjusts the voltage to the anti-noise voltage e when the stylus identification ID1 and the current stylus identification of the stylus correspond to the common electronic device.

The second Bluetooth unit sends ACK to the first Bluetooth unit.

After receiving the ACK, the first Bluetooth unit sends a second notification to the driving unit, which indicates that the voltage adjustment of the stylus is successful, and the second notification includes the voltage number 1.

The driving unit sends a second notification to the touch firmware unit.

The touch firmware unit performs noise detection, and when a signal-to-noise ratio corresponding to the detected second noise is less than a preset threshold, step 9 is executed, and when the signal-to-noise ratio corresponding to the second noise is not less than the preset threshold, steps 9-15 are not executed.

The touch firmware unit sends a frequency hopping request to the driving unit again, and the frequency hopping request carries the frequency number 1.

The driving unit sends the frequency number 1 and the stylus identification ID1 to the first Bluetooth unit.

The first Bluetooth unit transmits the frequency value b corresponding to the frequency number 1 and the stylus identification ID1 to the second Bluetooth unit.

The second Bluetooth unit receives the frequency value b and the stylus identification ID1, and adjusts the frequency to the frequency value b when the stylus identification ID1 and the current stylus identification of the stylus correspond to the common electronic device.

The second Bluetooth unit sends ACK to the first Bluetooth unit.

After receiving the ACK, the first Bluetooth unit sends a third notification to the driving unit, which indicates that the frequency adjustment of the stylus is successful, and the third notification includes the frequency number 1.

The driving unit issues a CMD to the touch firmware unit, which instructs the touch firmware unit to modify the DL frequency to the frequency value b corresponding to the frequency number 1.

After a period of time, if the touch firmware unit does not detect noise or the signal-to-noise ratio corresponding to the detected third noise is not less than the preset threshold, it initiates a request for returning the main frequency, which carries the frequency number 0. The frequency number 0 is the number corresponding to the main frequency a.

The driving unit sends the frequency number 0, the voltage number 0 and the stylus identification ID1 to the first Bluetooth unit. The frequency number 0 is the number corresponding to the main voltage f.

The first Bluetooth unit transmits the main frequency a corresponding to the frequency number 0, the main voltage f corresponding to the voltage number and the stylus identification ID1 to the second Bluetooth unit.

The second Bluetooth unit receives the main frequency a, the electric main voltage f and the stylus identification ID1, and adjusts the frequency to the main frequency a and the voltage to the main voltage f when the stylus identification ID1 and the current stylus identification of the stylus correspond to the common electronic device.

The second Bluetooth unit sends ACK to the first Bluetooth unit.

After receiving the ACK, the first Bluetooth unit sends a fourth notification to the driving unit, which indicates that the voltage and frequency adjustment of the stylus are successful, and the fourth notification includes the frequency number 0 and the voltage number 0.

The driving unit sends a CMD to the touch firmware unit, which instructs the touch firmware unit to modify the DL frequency to the main frequency a.

Figure 15:
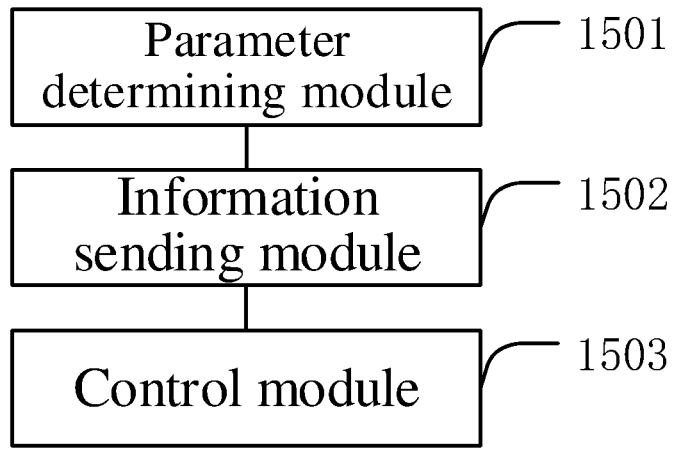
FIG. 15 is a block diagram of an electronic device according to an embodiment of the present disclosure.

FIG. 15 is a block diagram of an electronic device according to an embodiment of the present disclosure. Referring to FIG. 15, the electronic device includes: a parameter determining module 1501 configured to detect first noise and determine at least one control parameter, in which the first noise is noise affecting wireless communication between a stylus and an electronic device, and the at least one control parameter includes a parameter controlling the wireless communication between the stylus and the electronic device; an information sending module 1502 configured to send first indication information to the stylus, in which the first indication information includes at least one parameter value, each parameter value corresponds to one of the at least one control parameter, and the first indication information is configured to adjust the at least one control parameter to the corresponding parameter value; and a control module 1503 configured to control the wireless communication between the stylus and the electronic device in response to the adjusted control parameter.

In some embodiments, the at least one control parameter includes at least one of voltage or frequency, and the information sending module 1502 is configured to send at least one of voltage indication information corresponding to the voltage or frequency indication information corresponding to the frequency to the stylus. The voltage indication information includes a voltage value corresponding to the voltage and instructs adjustment of the voltage to the voltage value; and the frequency indication information includes a frequency value corresponding to the frequency and instructs adjustment of the frequency to the frequency value.

In some embodiments, the information sending module 1502 is configured to send the voltage indication information to the stylus; and send the frequency indication information to the stylus in response to receiving information on successful voltage adjustment returned by the stylus.

In some embodiments, the information sending module 1502 is configured to send the frequency indication information to the stylus; and send the voltage indication information to the stylus in response to receiving information on successful frequency adjustment returned by the stylus.

In some embodiments, the information sending module 1502 is configured to send the voltage indication information to the stylus; and send the frequency indication information to the stylus, in response to receiving information on successful voltage adjustment returned by the stylus and detecting second noise meeting a first condition, in which the second noise meeting the first condition includes that a signal-to-noise ratio corresponding to the second noise is less than a preset threshold.

In some embodiments, the information sending module 1502 is configured to send the frequency indication information to the stylus; and send the voltage indication information to the stylus, in response to receiving information on successful frequency adjustment returned by the stylus and detecting second noise meeting a first condition, in which the second noise meeting the first condition includes that a signal-to-noise ratio corresponding to the second noise is less than a preset threshold.

In some embodiments, the information sending module 1502 is configured to send the voltage indication information and the frequency indication information simultaneously to the stylus.

In some embodiments, the electronic device further includes a frequency adjusting module configured to adjust a downlink frequency to the frequency value in response to receiving information on successful frequency adjustment returned by the stylus, in which the downlink frequency is a frequency of receiving a signal sent by the stylus.

In some embodiments, the information sending module 1502 is further configured to send second indication information to the stylus in response to detecting no noise or detecting third noise meeting a second condition. The second indication information includes a preset voltage value and a preset frequency value, and the second indication information instructs the stylus to adjust voltage to the preset voltage value and frequency to the preset frequency value. The third noise meeting the second condition includes that a signal-to-noise ratio corresponding to the third noise is greater than or equal to a preset threshold.

In some embodiments, the first indication information further includes a first stylus identification, and the first stylus identification is a stylus identification for determining the at least one control parameter. The first indication information is configured to adjust the at least one control parameter to the corresponding parameter value in case that the first stylus identification and a current stylus identification of the stylus correspond to a common electronic device, in which the current stylus identification of the stylus is a second stylus identification.

In some embodiments, the electronic device includes a touch firmware unit, a driving unit and a Bluetooth unit. The parameter determining module 1501 is configured to detect the first noise and sending an adjustment request to the driving unit, through the touch firmware unit, in which the adjustment request carries a parameter identification corresponding to the at least one control parameter, and the parameter identification represents the parameter value corresponding to the control parameter. The information sending module 1502 is configured to receive the adjustment request and sending the adjustment request to the Bluetooth unit, through the driving unit; and determine the parameter value corresponding to the at least one control parameter according to the adjustment request and sending the first indication information to the stylus, through the Bluetooth unit.

With regard to the device in the above embodiments, the specific way in which each module performs operations has been described in detail in relevant embodiments of the method, and will not be described in detail here.

Figure 16:
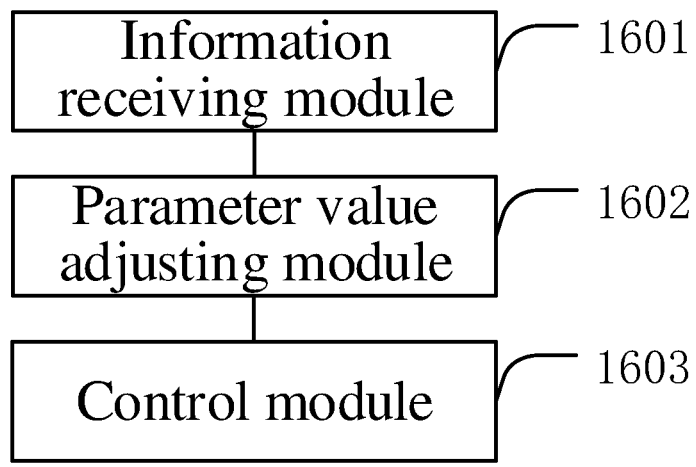
FIG. 16 is a block diagram of a stylus according to an embodiment of the present disclosure.

FIG. 16 is a block diagram of a stylus according to an embodiment of the present disclosure. Referring to FIG. 16, the stylus includes an information receiving module 1601 configured to receive first indication information sent by an electronic device, in which the first indication information includes a parameter value corresponding to at least one control parameter, each parameter value corresponds to one of the at least one control parameter, the at least one control parameter is determined in case that first noise is detected by the electronic device, the first noise is noise affecting wireless communication between a stylus and the electronic device, and the at least one control parameter includes a parameter controlling the wireless communication between the stylus and the electronic device; a parameter value adjusting module 1602 configured to adjust the at least one control parameter to the corresponding parameter value; and a control module 1603 configured to control the wireless communication between the stylus and the electronic device in response to the adjusted control parameter.

In some embodiments, the first indication information further includes a first stylus identification, and the first stylus identification is a stylus identification for determining the at least one control parameter by the electronic device. The parameter value adjusting module 1602 is configured to adjust the at least one control parameter to the corresponding parameter value in case that the first stylus identification and a current stylus identification of the stylus correspond to a common electronic device, in which the current stylus identification of the stylus is a second stylus identification.

With regard to the device in the above embodiments, the specific way in which each module performs operations has been described in detail in the embodiments of the method, and will not be described in detail here.

Embodiments of the present disclosure also provides an electronic device, including a processor; and a memory for storing an instruction executable by the processor. The processor is configured to perform the control method in the above embodiments.

Figure 17:
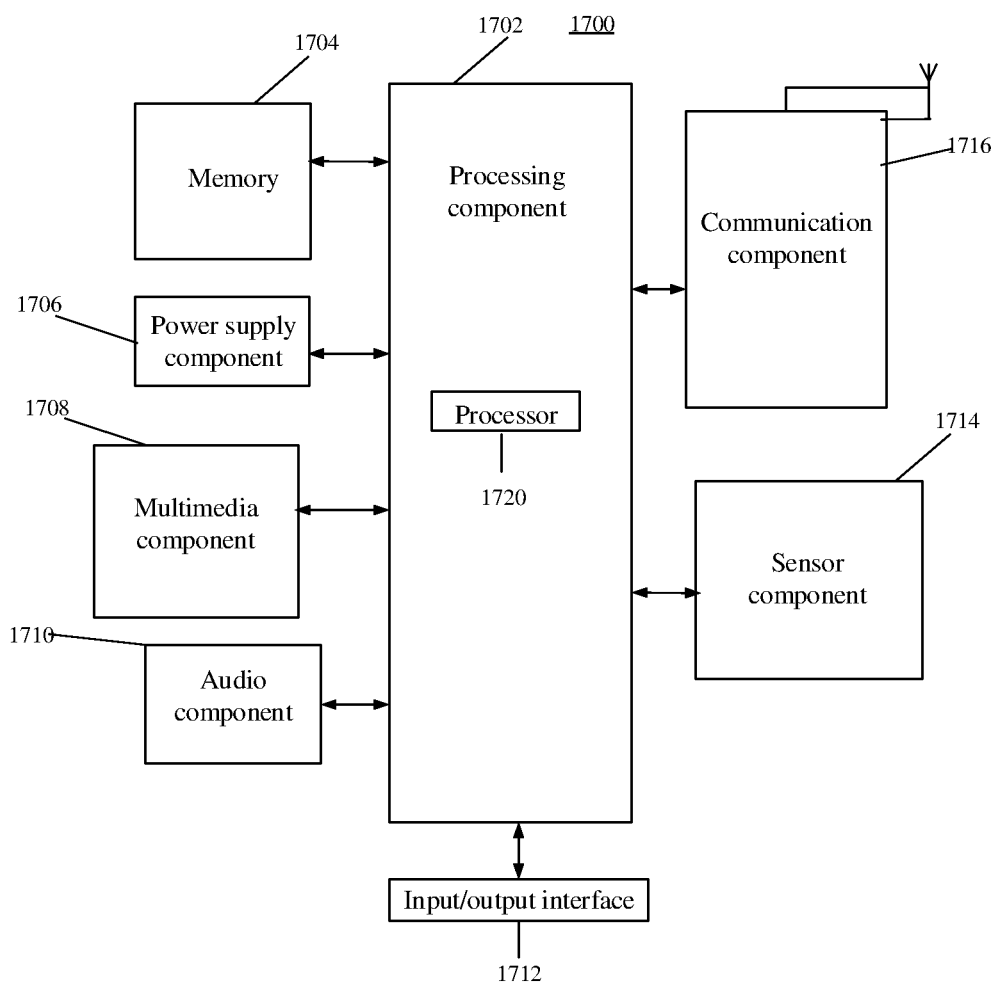
FIG. 17 is a block diagram of an electronic device according to an embodiment of the present disclosure.

FIG. 17 is a block diagram of an electronic device 1700 according to an embodiment of the present disclosure.

Referring to FIG. 17, the electronic device 1700 may include one or more of the following components: a processing component 1702, a memory 1704, a power supply component 1706, a multimedia component 1708, an audio component 1710, an input/output (I/O) interface 1712, a sensor component 1714, and a communication component 1716.

The processing component 1702 generally controls the overall operation of the electronic device 1700, such as operations associated with display, telephone call, data communication, camera operation and recording operation. The processing component 1702 may include one or more processors 1720 to execute instructions to complete all or part of the steps of the method described above. In addition, the processing component 1702 can include one or more modules to facilitate interaction between the processing component 1702 and other components. For example, the processing component 1702 can include a multimedia module to facilitate interaction between the multimedia component 1708 and the processing component 1702.

The memory 1704 is configured to store various types of data to support operations in the electronic device 1700. Examples of these data include instructions for any application or method operating on the electronic device 1700, contact data, phone book data, messages, pictures, videos, and the like. The memory 1704 can be realized by any type of volatile or nonvolatile memory device or their combination, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk.

The power supply component 1706 provides power for various components of the electronic device 1700. The power supply component 1706 may include a power management system, one or more power supplies, and other components associated with generating, managing and distributing power for the electronic device 1700.

The multimedia component 1708 includes a screen that provides an output interface between the electronic device 1700 and the user. In some embodiments, the screen may include a liquid crystal display (LCD) and a touch panel (TP). If the screen includes a touch panel, the screen may be implemented as a touch screen to receive an input signal from a user. The touch panel includes one or more touch sensors to sense touch, sliding and gestures on the touch panel. The touch sensor may not only sense the boundary of a touch or sliding action, but also detect the duration and pressure related to the touch or sliding operation. In some embodiments, the multimedia component 1708 includes a front camera and/or a rear camera. When the electronic device 1700 is in an operation mode, such as a photographing mode or a video mode, the front camera and/or the rear camera can receive external multimedia data. Each front camera and rear camera can be a fixed optical lens system or have focal length and optical zoom capability.

The audio component 1710 is configured to output and/or input audio signals. For example, the audio component 1710 includes a microphone (MIC) configured to receive external audio signals when the electronic device 1700 is in operation modes, such as a call mode, a recording mode and a voice recognition mode. The received audio signal may be further stored in the memory 1704 or transmitted via the communication component 1716. In some embodiments, the audio component 1710 further includes a speaker for outputting audio signals.

The I/O interface 1712 provides an interface between processing component 1702 and peripheral interface modules, which can be keyboards, clickwheels, buttons, etc. These buttons may include, but are not limited to, home button, volume button, start button and lock button.

The sensor component 1714 includes one or more sensors for providing various aspects of the status assessment for the electronic device 1700. For example, the sensor component 1714 can detect the on/off state of the electronic device 1700, the relative positioning of components, such as the display and keypad of the electronic device 1700, the position change of the electronic device 1700 or a component of the electronic device 1700, the presence or absence of user contact with the electronic device 1700, the orientation or acceleration/deceleration of the electronic device 1700, and the temperature change of the electronic device 1700. The sensor component 1714 may include a proximity sensor configured to detect the presence of a nearby object without any physical contact. The sensor component 1714 may also include an optical sensor, such as a CMOS or CCD image sensor, for use in imaging applications. In some embodiments, the sensor component 1714 may further include an acceleration sensor, a gyro sensor, a magnetic sensor, a pressure sensor or a temperature sensor.

The communication component 1716 is configured to facilitate wired or wireless communication between the electronic device 1700 and other devices. The electronic device 1700 can access a wireless network based on communication standards, such as WiFi, 2G, 3G, 4G, 5G or a combination thereof. In an embodiment, the communication component 1716 receives a broadcast signal or broadcast related information from an external broadcast management system via a broadcast channel. In an embodiment, the communication component 1716 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an embodiment, the electronic device 1700 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronic components for performing the above-mentioned methods.

In an embodiment, there is also provided a non-transitory computer-readable storage medium including instructions, such as the memory 1704 including instructions, which can be executed by the processor 1720 of the electronic device 1700 to perform the above method. For example, the non-transitory computer-readable storage medium can be ROM, random access memory (RAM), CD-ROM, magnetic tape, floppy disk, optical data storage device, etc.

Embodiments of the present disclosure also provide a non-transitory computer-readable storage medium, which, when instructions in the storage medium are executed by a processor of an electronic device, enables the electronic device to perform the control method in the above embodiments.

The embodiment of the present disclosure also provides a stylus, including a processor; and a memory for storing an instruction executable by the processor. The processor is configured to perform the control method in the above embodiment.

The embodiment of the present disclosure also provides a non-transitory computer-readable storage medium having stored therein an instruction that, when executed by a processor of a stylus, causes the stylus to perform the control method according to the first aspect of embodiments of the present disclosure.

Other embodiments of the present disclosure will be conceivable to those skilled in the art after considering the specification and practicing the present disclosure disclosed herein. This application is intended to cover any variation, use or adaptation of the present disclosure, which follows general principles of the present disclosure and includes common knowledge or conventional technical means in the art not disclosed here. The specification and examples are merely exemplary, and the true scope of the present disclosure is indicated by the appended claims.

It should be understood that the present disclosure is not limited to the structures described above and shown in the drawings, and various modifications and changes can be made without departing from the scope. The scope of the present disclosure is limited only by the appended claims.

What is claimed is:

1. A control method, comprising:
    detecting first noise and determining at least one control parameter, wherein the first noise is noise affecting wireless communication between a stylus and an electronic device, and the at least one control parameter comprises a parameter controlling the wireless communication between the stylus and the electronic device;
    sending first indication information to the stylus, wherein the first indication information comprises at least one parameter value, each parameter value corresponds to one of the at least one control parameter, and the first indication information is configured to adjust the at least one control parameter to the corresponding parameter value; and
    controlling the wireless communication between the stylus and the electronic device in response to the adjusted control parameter;
    wherein the at least one control parameter comprises both voltage and frequency, and sending the first indication information to the stylus comprises:
        sending voltage indication information corresponding to the voltage and frequency indication information corresponding to the frequency to the stylus, wherein the voltage indication information comprises a voltage value corresponding to the voltage and instructs adjustment of the voltage to the voltage value; and the frequency indication information comprises a frequency value corresponding to the frequency and instructs adjustment of the frequency to the frequency value,
    wherein sending the voltage indication information corresponding to the voltage and the frequency indication information corresponding to the frequency to the stylus comprises:
        sending the voltage indication information to the stylus; and in response to receiving information on successful voltage adjustment returned by the stylus and detecting second noise meeting a first condition, sending the frequency indication information to the stylus, wherein the second noise meeting the first condition comprises that a signal-to-noise ratio corresponding to the second noise is less than a preset threshold.

2. The control method according to claim 1, further comprising:
adjusting a downlink frequency to the frequency value in response to receiving information on successful frequency adjustment returned by the stylus, wherein the downlink frequency is a frequency of receiving a signal sent by the stylus.

3. The control method according to claim 1, wherein after sending the first indication information to the stylus, the control method further comprises:
sending second indication information to the stylus in response to detecting no noise or detecting third noise meeting a second condition,
wherein the second indication information comprises a preset voltage value and a preset frequency value, and the second indication information instructs the stylus to adjust voltage to the preset voltage value and frequency to the preset frequency value; and
the third noise meeting the second condition comprises that a signal-to-noise ratio corresponding to the third noise is greater than or equal to a preset threshold.

4. The control method according to claim 1, wherein:
the first indication information further comprises a first stylus identification, and the first stylus identification is a stylus identification for determining the at least one control parameter, and
the first indication information is configured to adjust the at least one control parameter to the corresponding parameter value in case that the first stylus identification and a current stylus identification of the stylus correspond to a common electronic device, wherein the current stylus identification of the stylus is a second stylus identification.

5. The control method according to claim 1, wherein:
the electronic device comprises a touch firmware unit, a driving unit and a Bluetooth unit;
detecting the first noise and determining the at least one control parameter comprises:
detecting the first noise and sending an adjustment request to the driving unit, through the touch firmware unit, wherein the adjustment request carries a parameter identification corresponding to the at least one control parameter, and the parameter identification represents the parameter value corresponding to the control parameter;
sending the first indication information to the stylus comprises:
receiving the adjustment request and sending the adjustment request to the Bluetooth unit, through the driving unit; and
determining the parameter value corresponding to the at least one control parameter according to the adjustment request and sending the first indication information to the stylus, through the Bluetooth unit.

6. A control method, comprising:
receiving first indication information sent by an electronic device, wherein the first indication information comprises a parameter value corresponding to at least one control parameter, and each parameter value corresponds to one of the at least one control parameter; the at least one control parameter is determined in case that first noise is detected by the electronic device, and the first noise is noise affecting wireless communication between a stylus and the electronic device; and the at least one control parameter comprises a parameter controlling the wireless communication between the stylus and the electronic device;
adjusting the at least one control parameter to the corresponding parameter value; and
controlling the wireless communication between the stylus and the electronic device in response to the adjusted control parameter;
wherein the at least one control parameter comprises both voltage and frequency, and sending the first indication information to the stylus comprises:
sending voltage indication information corresponding to the voltage and frequency indication information corresponding to the frequency to the stylus, wherein the voltage indication information comprises a voltage value corresponding to the voltage and instructs adjustment of the voltage to the voltage value; and the frequency indication information comprises a frequency value corresponding to the frequency and instructs adjustment of the frequency to the frequency value,
wherein sending the voltage indication information corresponding to the voltage and the frequency indication information corresponding to the frequency to the stylus comprises:
sending the voltage indication information to the stylus; and
in response to receiving information on successful voltage adjustment returned by the stylus and detecting second noise meeting a first condition, sending the frequency indication information to the stylus, wherein the second noise meeting the first condition comprises that a signal-to-noise ratio corresponding to the second noise is less than a preset threshold.

7. The control method according to claim 6, wherein:
the first indication information further comprises a first stylus identification, and the first stylus identification is a stylus identification for determining the at least one control parameter by the electronic device; and
adjusting the at least one control parameter to the corresponding parameter value comprises:
adjusting the at least one control parameter to the corresponding parameter value in case that the first stylus identification and a current stylus identification of the stylus correspond to a common electronic device, wherein the current stylus identification of the stylus is a second stylus identification.

8. A stylus, comprising:
a processor; and
a memory for storing an instruction executable by the processor;
wherein the processor is configured to perform the control method according to claim 6.

9. An electronic device, comprising:
a processor; and
a memory for storing an instruction executable by the processor;
wherein the processor is configured to:
detect first noise and determine at least one control parameter, wherein the first noise is noise affecting wireless communication between a stylus and an electronic device, and the at least one control parameter comprises a parameter controlling the wireless communication between the stylus and the electronic device;

send first indication information to the stylus, wherein the first indication information comprises at least one parameter value, each parameter value corresponds to one of the at least one control parameter, and the first indication information is configured to adjust the at least one control parameter to the corresponding parameter value; and control the wireless communication between the stylus and the electronic device in response to the adjusted control parameter;

wherein the at least one control parameter comprises both voltage and frequency, and sending the first indication information to the stylus comprises:

sending voltage indication information corresponding to the voltage and frequency indication information corresponding to the frequency to the stylus, wherein the voltage indication information comprises a voltage value corresponding to the voltage and instructs adjustment of the voltage to the voltage value; and the frequency indication information comprises a frequency value corresponding to the frequency and instructs adjustment of the frequency to the frequency value, wherein sending the voltage indication information corresponding to the voltage and the frequency indication information corresponding to the frequency to the stylus comprises:

sending the voltage indication information to the stylus; and in response to receiving information on successful voltage adjustment returned by the stylus and detecting second noise meeting a first condition, sending the frequency indication information to the stylus, wherein the second noise meeting the first condition comprises that a signal-to-noise ratio corresponding to the second noise is less than a preset threshold.

* * * * *